(12) United States Patent
Greenebaum et al.

(10) Patent No.: US 8,600,159 B2
(45) Date of Patent: Dec. 3, 2013

(54) COLOR CONVERTING IMAGES

(75) Inventors: Kenneth I. Greenebaum, San Carlos, CA (US); Steve Swen, Cupertino, CA (US); John S. Bushell, San Jose, CA (US)

(73) Assignee: Apple Inc., Cupertino, CA (US)

( * ) Notice: Subject to any disclaimer, the term of this patent is extended or adjusted under 35 U.S.C. 154(b) by 214 days.

(21) Appl. No.: 13/163,596

(22) Filed: Jun. 17, 2011

(65) Prior Publication Data

US 2012/0051636 A1     Mar. 1, 2012

Related U.S. Application Data

(60) Provisional application No. 61/378,922, filed on Aug. 31, 2010.

(51) Int. Cl.
*G06K 9/00*     (2006.01)

(52) U.S. Cl.
USPC .......................................................... 382/167

(58) Field of Classification Search
USPC .................. 382/162, 165, 167, 254, 276; 348/223.1, 649, 650; 358/518–520; 345/589, 590, 591, 600, 604
See application file for complete search history.

(56) References Cited

U.S. PATENT DOCUMENTS

| | | | | |
|---|---|---|---|---|
| 5,185,661 | A | * | 2/1993 | Ng ................................ 358/505 |
| 5,416,890 | A | * | 5/1995 | Beretta .......................... 345/590 |
| 6,225,974 | B1 | * | 5/2001 | Marsden et al. ............... 345/590 |
| 6,246,396 | B1 | | 6/2001 | Gibson et al. |
| 6,262,710 | B1 | * | 7/2001 | Smith ............................. 345/589 |
| 6,594,388 | B1 | * | 7/2003 | Gindele et al. ................ 382/167 |
| 6,693,643 | B1 | | 2/2004 | Trivedi et al. |
| 6,724,507 | B1 | * | 4/2004 | Ikegami et al. ............... 358/518 |
| 2005/0243352 | A1 | | 11/2005 | Fujiwara et al. |
| 2008/0055682 | A1 | | 3/2008 | Minamino |

* cited by examiner

*Primary Examiner* — Jose Couso
(74) *Attorney, Agent, or Firm* — Adeli & Tollen LLP

(57) ABSTRACT

Some embodiments of the invention provide novel methods for converting the color region of images. For instance, the method of some embodiments converts the color of an image from one color region (e.g., from a Rec. 601 color region) to another color region (e.g., to a Rec. 709 color region). In some embodiments, the method receives the image in a first color format that is non-linearly encoded within a first color region. Without performing a linearization operation to linearize the color component values of the image, the method then converts the image into a second color format that is defined with respect to a second color region. In some embodiments, the color-converted image is non-linearly encoded in the second color region.

40 Claims, 22 Drawing Sheets

| 8 Bit LUT Index | | |
|---|---|---|
| $Y_0^{SD}$ | $Cb_0^{SD}$ | $Cr_0^{SD}$ |
| $Y_1^{SD}$ | $Cb_0^{SD}$ | $Cr_0^{SD}$ |
| ⋮ | ⋮ | ⋮ |
| $Y_{255}^{SD}$ | $Cb_{255}^{SD}$ | $Cr_{254}^{SD}$ |
| $Y_{255}^{SD}$ | $Cb_{255}^{SD}$ | $Cr_{255}^{SD}$ |

→ 3x256x256x256
~ 50 Megabytes

- - - Versus - - -

1305

| 5 Bit Sub Sampled LUT Index | | |
|---|---|---|
| $Y_0^{SD}$ | $Cb_0^{SD}$ | $Cr_0^{SD}$ |
| $Y_1^{SD}$ | $Cb_0^{SD}$ | $Cr_0^{SD}$ |
| ⋮ | ⋮ | ⋮ |
| $Y_{31}^{SD}$ | $Cb_{31}^{SD}$ | $Cr_{30}^{SD}$ |
| $Y_{31}^{SD}$ | $Cb_{31}^{SD}$ | $Cr_{31}^{SD}$ |

→ 3x32x32x32
~ 96 Kilobytes

*Figure 13*

- - - Versus - - -

COLOR CONVERTING IMAGES

CLAIM OF BENEFIT TO PRIOR APPLICATION

This application claims the benefit of U.S. Provisional Application 61/378,922, entitled "Color Converting Images," filed Aug. 31, 2010. U.S. Provisional Application 61/378,922 is incorporated herein by reference.

BACKGROUND

Each device for capturing, creating, editing and displaying video content has a set of color reproduction attributes. One such set of attributes is the color domain (called color region or color gamut) of the device. A color domain of a device specifies the range of colors that the device can capture or produce. Color domains are also specified based on standards propagated by different standard setting organizations.

FIG. 1 illustrates two different color domains for video. Specifically, it illustrates a traditional CIE diagram 105 (more accurately referred to as a "CIE 1931 Color Space" diagram) that has two triangular regions 110 and 115 marked on this diagram. Each of these triangles represents a different color domain (i.e., a different range of colors) that is specified by a different color standard for video. The triangular region 110 represents the range of colors (i.e., the color gamut) specified by Rec. 601, a standard definition video standard, while the triangular region 115 represents the range of colors (i.e., the color gamut) specified by Rec. 709, a high definition video standard. As shown in FIG. 1, the Rec. 601 gamut specifies a different region in the color space than the Rec. 709 gamut.

The three vertices of each triangular region are the base non-white color points that define the triangular region. These three base non-white color points are often the most saturated base colors that are available in the particular color region that is depicted on the CIE diagram. The three base non-white colors are often referred to as the three primary colors. Some embodiments express a color region in terms of the three primary colors along with a white point. The white point in some such embodiments is a point inside the triangularly represented color region that is designated as the white point in the gamut. From the location of the white point, some embodiments generate weighting values to use to combine the primary colors to represent the "whitest" value for the color region.

Video content is often defined based on a color region (e.g., of a device or a standard) that differs from the color region of a device that displays the content. Accordingly, before playing back video content, some devices perform a series of color conversion operations to reformat the component color values of the content for display on the devices.

FIG. 2 illustrates one such series of operations. Specifically, it illustrates a color processing system 200 that performs five color processing operations to transform the colors of a video stream from a Rec. 601 standard definition, Y'CbCr format to a Rec. 709 high definition, Y'CbCr color format.

The first operation is a color coordinate system transform operation 205 that transforms the color of each video frame from a Rec. 601 Y'CbCr format to a Rec. 601 R'G'B' format. In the received video, the brightness component is a luma component Y', which is the weighted sum of the gamma-compressed R'G'B' components of a color video. The non-linear gamma encoding of the luma value causes the R'G'B' color components that result from the color coordinate transform operation 205 to also be non-linear and gamma encoded (which, in FIG. 2, is indicated as $R'G'B'_{601}$).

To transform the colors of the video stream from the Rec. 601 color region to the Rec. 709 color region, the color processing system 200 performs a linearization operation 210 to transform the non-linear format of the $R'G'B'_{601}$ color components to a linear $RGB_{601}$ format of these components. The linearization operation applies an inverse power operation that removes the exponential gamma value that affects the RGB color component values.

After placing the RGB values in the linear domain, the color processing system 200 performs a color region conversion operation 215. This operation transforms the color values of the video from a Rec. 601 color region to a Rec. 709 color region. After this conversion, the system performs a gamma operation 220 on the $RGB_{709}$ video content output from the color conversion process 215. Finally, the system 225 performs a color coordinate transform operation 225 on the $R'G'B'_{709}$ video content that is output from the gamma operation 220. This color coordinate transform operation 225 converts the color coordinate system of the video from $R'G'B'_{709}$ format to $Y'CbCr_{709}$ format.

The color processing system 200 requires specialty hardware components to allow it to perform its color correction operations quickly. For instance, in some cases, the color system requires specialty processors (e.g., graphics processors) that include operators for performing the linearization and gamma operations. Such specialty hardware is not available in all systems in which color conversion operations are desirable. Also, such hardware adds to the overall system cost.

BRIEF SUMMARY

Some embodiments of the invention provide several novel methods for converting the color region of images. For instance, the method of some embodiments converts the color of an image from one color region (e.g., from a Rec. 601 color region) to another color region (e.g., to a Rec. 709 color region). In some embodiments, the method receives the image in a first color format that is non-linearly encoded within a first color region. One example of a non-linearly encoded image that is defined in a first color region is a Y'CbCr video image that is defined in a Rec. 601 color region. In this video image, the luma component is gamma encoded.

Without performing a linearization operation to linearize the color component values of the image, the method then converts the image into a second color format that is defined with respect to a second color region. In some embodiments, the color-converted image is non-linearly encoded in the second color region. One example of such image that is non-linearly encoded in a second color format that is defined in a second color region is a Y'CbCr video image, which is defined in a Rec. 709 color region. In this example, the luma component is also gamma encoded. Also, in this example the first and second color formats are the same (i.e., both are Y'CbCr). However, in other embodiments, the first and second color formats are different (e.g., one color format is Y'CbCr, while the other color format is RGB).

To compensate for performing the color region conversion without the linearization operation, the method of some embodiments adjusts the parameters of one or more of its color conversion operators to account for the non-linear nature of the color values of the received image. For instance, in some embodiments, the method uses a transform matrix (e.g., a 3×3 transform matrix) to convert the color of the image from one color region to another. In some of these embodiments, the elements of the transform matrix are defined to account for the fact that the color region conversion is performed on image data that is in a non-linear color domain. For example, in some embodiments, the matrix elements minimize the difference between (1) the desired, converted color values in the second color region and (2) the actual color values that are produced in the second color region by the color conversion process that foregoes the linearization operation.

Some embodiments define such matrix elements through an optimization process that first identifies, for several samples in the first color region, the desired, converted color values through a color conversion process that performs the linearization and gamma operations. After identifying the desired, converted color values for several samples in the first color region, these embodiments then explore the solution space of available matrix element values to identify one set of values that minimizes the difference between the desired, converted color values and the color values obtained through the color conversion process that foregoes linearization.

Some embodiments further optimize this process by selecting more sample points from the sub-region(s) of interest in the first color region than from the other sub-regions within the first color region. For example, some embodiments select more sample points in the sub-region corresponding to skin tones in the first color region. The selection of more sample points from sub-region(s) of interest causes the optimization process for defining the matrix elements to be biased in favor of producing good quality color conversion for color values that fall within sub-region(s) of interest.

Other embodiments provide other novel methods for converting the color region of images. For instance, to convert the color component values of images that are defined in a first color region to a second color region, the method of some embodiments (1) pre-tabulates the converted, second color component values for some or all possible color component values in the first color region, and (2) stores these pre-tabulated values in a storage structure, such as a look-up table. When converting the colors of an image, the storage structure can then be accessed to convert the component color values of each pixel in the image from the first color region to the second color region.

Some embodiments employ one or more techniques to reduce the size of the storage structure and improve performance. For instance, instead of storing converted color component values for each possible color sample in the first color region, some embodiments store the component color values for only the image color samples that might be encountered in processing a particular class of images. Accordingly, when processing video frames, some embodiments only store component color values for color samples in the video range, as many digital video encoding formats reserve bands of code values for non-visible values (e.g., super blacks) outside of the ranges of values that they use for showing visible colors.

Instead of or in conjunction with this technique, some embodiments only store a sub-sample of component color values (i.e., store component color values for some but not all color samples) that might be needed when performing a color region conversion on a set of images. When the color conversion method of these embodiments encounters a particular pixel's component color sample for which it does not have a stored set of component color values, the method (1) retrieves several sets of component color values that are stored for several color samples that are near the particular component color sample in the first region, (2) computes a set of component color values through an interpolation or extrapolation operation that uses the retrieved sets of component color values, and (3) assigns the component color value set to the particular pixel as its color in the second color region. Alternatively, when the color conversion method of these embodiments has a stored set of component color values for a particular pixel's component color sample, it uses the stored set of component color values as the component color values of the particular pixel in the second color region.

Instead of storing complete color component value sets, the method of some embodiments reduces the size of the storage structure by delta encoding the component color values that they store. Delta encoding the component color values entails only storing delta color component value sets. A delta color component set is a set of component color values that are applied (e.g., added) to a pixel's color component values to convert the pixel's color from the first region to a second region. When a pixel's color component values in the first region are viewed as a vector that define the pixel's color in a multi-dimensional color coordinate system, the delta color component set can be viewed as a color transform vector that is to be applied to the pixel's color component values to express this pixel's color in the second region. Some embodiments combine the sub-sampling and delta-encoding techniques by storing only a sub-sample of the delta encoded component color values that might be needed when performing color region conversions on a set of images.

In storing only a sub-sample of values, the method of some embodiments further reduces the size of the storage structure by reducing the number of bits used to index this structure. For instance, to index a storage structure that stores full or delta encoded component color values for three color components, some embodiments use n-bits (e.g., 8 bits) to express each particular color component but less than n-bits to index the storage structure for the particular color component's converted value.

In conjunction with or instead of the sub-sampling, delta encoding, and/or other storage reduction techniques, the method of some embodiments that process Y'CbCr image data, reduces the size of the storage structure and the number of accesses to the storage structure by only storing values for performing a color region conversion on the chroma values and not on the luma values. These embodiments assume that in performing the color conversion the luminance or luma values will not be changed or, if changed, the change will be very slight. Accordingly, these embodiments store color conversion values for only converting the chroma values.

Still other embodiments use other techniques to perform lookups in the sub-sample chroma space (i.e., 4:2:0 space) in order to reduce the size of the storage structure and the number of accesses to the storage structure. For instance, when performing color region conversion from 4:2:0 Y'CbCr$_{601}$ to 4:2:0 Y'CbCr$_{709}$, these embodiments sub-sample the four luma values to a single luma and combine this value with the chroma values to access the storage structure.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 13 illustrates that the method of some embodiments reduces the size of the LUT by reducing the number of bits used to index this structure.

DETAILED DESCRIPTION

In the following description, numerous details are set forth for purpose of explanation. However, one of ordinary skill in the art will realize that the invention may be practiced without the use of these specific details.

Some embodiments of the invention provide several novel methods for converting the color region of images. For instance, the method of some embodiments converts the color of an image from one color region (e.g., from a Rec. 601 color region) to another color region (e.g., to a Rec. 709 color region). In some embodiments, the method receives the image in a first color format that is non-linearly encoded within a first color region. One example of a non-linearly encoded image that is defined in a first color region is a Y'CbCr video image that is defined in a Rec. 601 color region. In this video image, the luma component is gamma encoded.

Without performing a linearization operation to linearize the color component values of the image, the method then converts the image into a second color format that is defined with respect to a second color region. In some embodiments, the color-converted image is non-linearly encoded in the second color region. One example of such image that is non-linearly encoded in a second color format that is defined in a second color region is a Y'CbCr video image, which is defined in a Rec. 709 color region. In this example, the luma component is also gamma encoded. Also, in this example the first and second color formats are the same (i.e., both are Y'CbCr). However, in other embodiments, the first and second color formats are different (e.g., one color format is Y'CbCr, while the other color format is RGB).

To compensate for performing the color region conversion without the linearization operation, the method of some embodiments adjusts the parameters of one or more of its color conversion operators to compensate for the non-linear nature of the color values of the received image. For instance, in some embodiments, the method uses a transform matrix (e.g., a 3×3 transform matrix) to convert the color of the image from one color region to another. In some of these embodiments, the elements of the transform matrix are defined to account for the fact that the color region conversion is performed on image data that is in a non-linear color domain. For example, in some embodiments, the matrix elements minimize the difference between (1) the desired, converted color values in the second color region and (2) the actual color values that are produced in the second color region by the color conversion process that foregoes the linearization operation.

Figure 1:
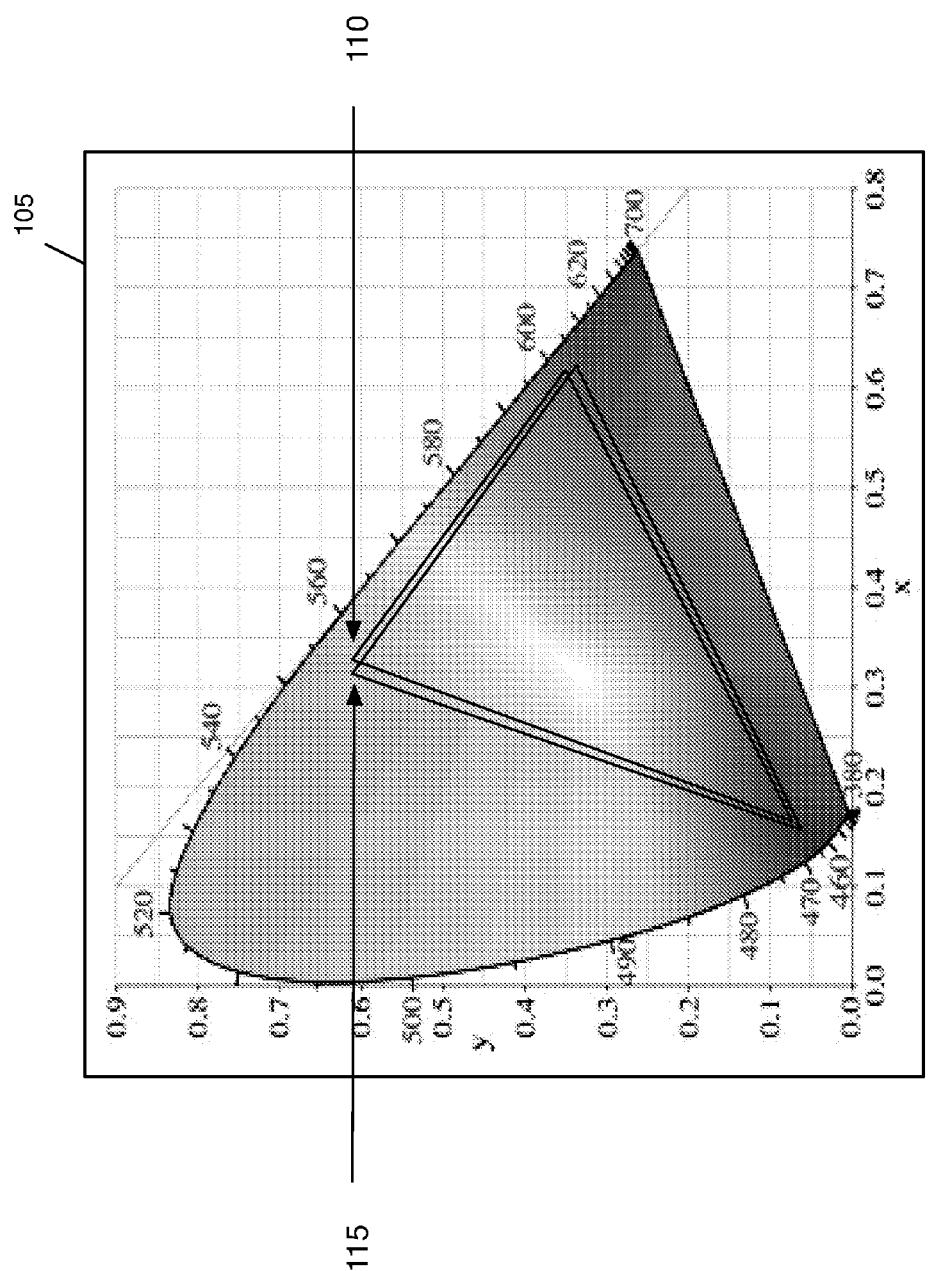
FIG. 1 illustrates two different color domains for video.
Figure 2:
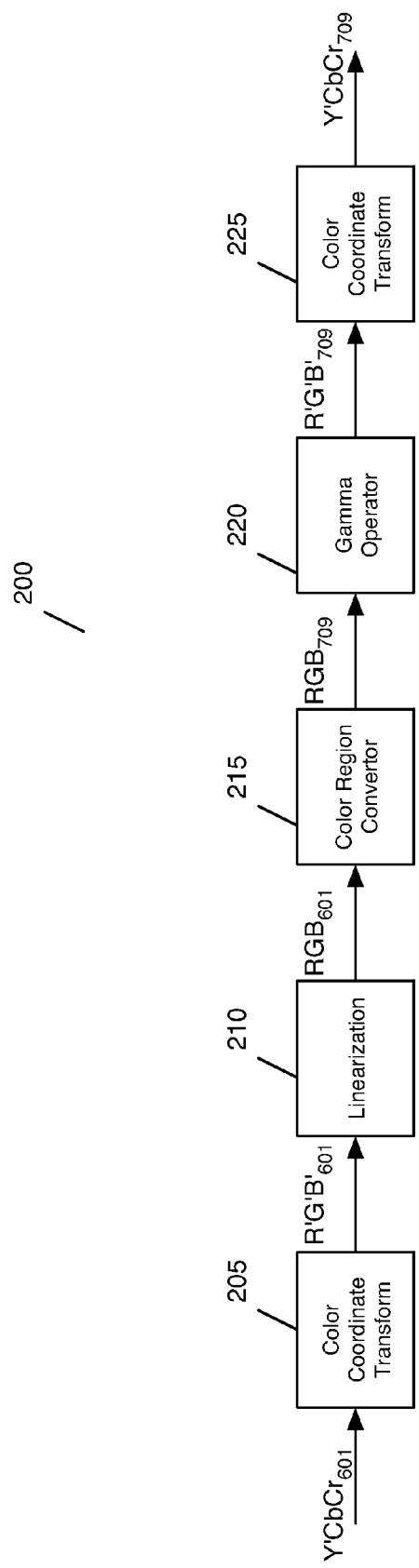
FIG. 2 illustrates a series of color conversion operations to reformat the component color values of the content of display on the devices.

Some embodiments define such matrix elements through an optimization process that first identifies, for several samples in the first color region, the desired, converted color values through a color conversion process that performs the linearization and gamma operations. One example of such a color conversion process is the set of color conversion operations that are illustrated in FIG. 2. After identifying the desired, converted color values for several samples in the first color region, these embodiments then explore the solution space of available matrix element values to identify one set of values that minimizes the difference between the desired, converted color values and the color values obtained through the color conversion process that foregoes linearization.

Some embodiments further optimize this process by selecting more sample points from the sub-region(s) of interest in the first color region than from the other sub-regions within the first color region. For example, some embodiments select more sample points in the sub-region corresponding to skin tones in the first color region. The selection of more sample points from sub-region(s) of interest causes the optimization process for defining the matrix elements to be biased in favor of producing good quality color conversion for color values that fall within sub-region(s) of interest.

Other embodiments provide other novel methods for converting the color region of images. For instance, to convert the color component values of images that are defined in a first color region to a second color region, the method of some embodiments (1) pre-tabulates the converted, second color component values for some or all possible color component values in the first color region, and (2) stores these pre-tabulated values in a storage structure, such as a look-up table. When converting the colors of an image, the storage structure can then be accessed to convert the component color values of each pixel in the image from the first color region to the second color region.

Some embodiments employ one or more techniques to reduce the size of the storage structure and improve performance. For instance, instead of storing converted color component values for each possible color sample in the first color region, some embodiments store the component color values for only the image color samples that might be encountered in processing a particular class of images. Accordingly, when processing video frames, some embodiments only store component color values for color samples in the video range, as many digital video encoding formats reserve bands of code values for non-visible values (e.g., super blacks) outside of the ranges of values that they use for showing visible colors.

Instead of or in conjunction with this technique, some embodiments only store a sub-sample of component color values (i.e., store component color values for some but not all color samples) that might be needed when color-region converting the colors of a set of images. When the color conversion method of these embodiments encounters a particular pixel's component color sample for which it does not have a stored set of component color values, the method (1) retrieves several sets of component color values that are stored for several color samples that are near the particular component color sample in the first region, (2) computes a set of component color values through an interpolation or extrapolation operation that uses the retrieved sets of component color values, and (3) assigns the component color value set to the particular pixel as its color in the second color region. Alternatively, when the color conversion method of these embodiments has a stored set of component color values for a particular pixel's component color sample, it uses the stored set of component color values as the component color values of the particular pixel in the second color region.

Instead of storing complete color component value sets, the method of some embodiments reduces the size of the storage structure by delta encoding the component color values that they store. Delta encoding the component color values entails only storing delta color component value sets. A delta color component set is a set of component color values that are meant to be applied (e.g., added) to a pixel's color component values to convert the pixel's color from the first region to the second region. When a pixel's color component values in the first region are viewed as a vector that define the pixel's color in a multi-dimensional color coordinate system, the delta color component set can be viewed as a color transform vector that is to be applied to the pixel's color component values to express this pixel's color in the second region. Some embodiments combine the sub-sampling and delta-encoding techniques by storing only a sub-sample of the delta encoded component color values that might be needed when color-region converting the colors of a set of images.

In storing only a sub-sample of values, the method of some embodiments further reduces the size of the storage structure by reducing the number of bits used to index the structure. For instance, to index a storage structure that stores full or delta encoded component color values for three color components, some embodiments use n-bits (e.g., 8 bits) to express each particular color component but less than n-bits to index the storage structure for the particular color component's converted value.

In conjunction with or instead of the sub-sampling, delta encoding, and/or other storage reduction techniques, the method of some embodiments that process Y'CbCr image data, reduces the number of accesses to the storage structure by only storing values for color-region converting the chrominance/chroma values and not the luminance or luma values. These embodiments assume that in performing the color conversion the luminance or luma values will not be changed or, if changed, the change will be very slight. Accordingly, these embodiments store color conversion values only for converting the chrominance/chroma values.

Still other embodiments use other techniques to perform lookups in the sub-sample chroma space (i.e., 4:2:0 space) in order to reduce the size of the storage structure and the number of accesses to the storage structure. For instance, when performing color region conversion from 4:2:0 Y'CbCr$_{601}$ to 4:2:0 Y'CbCr$_{709}$, these embodiments sub-sample the four luma values to a single luma and combine this value with the chroma values to access the storage structure.

Several more detailed embodiments will be described below. However, before describing these embodiments, Section I provides definitions of several terms that are used throughout this document. Section II then describes several embodiments that convert the video pixel colors from a Rec. 601 color region to a Rec. 709 color region without performing a linearization operation to linearize the color component values of the image. Section III then describes several embodiments that pre-tabulate a look up table containing one or more optimizations for converting video pixel colors from a Rec. 601 color region to a Rec. 709 color region. Finally, Section IV describes a computer system for implementing some embodiments of the invention.

I. DEFINITIONS

Two of the terms used in this document are color region and color coordinate system. A Cartesian color coordinate system can be used to define a color region for a particular image, a particular device, a particular standard, etc. Non-Cartesian coordinate systems can also be used to define a color region. Color coordinate systems are often, but not always, expressed in terms of three or four elements. For some color coordinate systems, these elements are often referred to as primary color channels. Examples of color coordinate systems include (1) the Red, Green, and Blue (RGB) coordinate system, (2) the luminance-chrominance (or luma-chroma) coordinate systems, such as YUV, Y'CbCr, etc., (3) the L,a,b coordinate system, (4) the HSV coordinate system, (5) device-independent X, Y, Z coordinate systems, etc.

A color region represents a region of colors that are available in a particular standard, are producible by a particular capture, output or display device, are part of an image, etc. Such a region is referred to as the color region in this document. A color region is sometimes referred to as a color space in other literature. However, as the term color space is at times confused with the color coordinate system, this document uses the term color region instead of color space.

A color region can be defined by reference to any coordinate system. Color coordinate system conversion refers to a transform operation that transforms a description of content from one color coordinate system (e.g., YUV) to another color coordinate system (e.g., RGB). For instance, when content is transformed from an RGB color coordinate system to a Y'CbCr color coordinate system, the representation of the color values of each pixel changes from an RGB representation (i.e., a representation that expresses the color of each pixel in terms of one red value, one green value and one blue value) to a Y'CbCr representation (i.e., a representation that expresses the color of each pixel in terms of one luma value Y' and two chroma values Cb and Cr). Typically, color coordinate system transformations are lossless operations.

Color region conversion, on the other hand, refers to a transform operation that transforms the color values of content from one color region (e.g., a color region defined by a Rec. 601 standard-definition video standard) to another color region (e.g., a color region defined by a Rec. 709 high-definition video standard). For instance, when content is transformed from a Rec. 601 standard definition standard to a Rec. 709 high definition standard, a color region transform operation is performed on the content in order to change each color value of each pixel from a Rec. 601 value to a Rec. 709 value. The color transform that is applied to the content is a transform that is designed to transform the Rec. 601 color region into the Rec. 709 color region. Some embodiments define such a transform by (1) identifying the set of operations that would scale, move, rotate and/or otherwise adjust a first color region (e.g., the Rec. 601 color region) to become a second color region (e.g., the Rec. 709 region), and (2) embedding these operations in a matrix form. These operations are designed to adjust the first color region to fit in the second color region with a minimal loss of color fidelity from the first color region. However, color region conversions are often lossy operations as their associated adjustment operations may not be able to convert a first color region into a second color region without losing part of the first color region.

Some embodiments perform the color conversion operation in a device-independent X, Y, Z color coordinate system. Specifically, when the input content to the color region conversion is defined initially in terms of another coordinate system (e.g., an RGB coordinate system), these embodiments first transform the content's color description from the other coordinate system to the X, Y, Z coordinate system. These embodiments then perform the color region conversion. After performing this color region conversion, these embodiments transform the content from the X, Y, Z coordinate system back to the other coordinate system (e.g., back to the RGB coordinate system). Some embodiments combine one or more matrices that perform the transforms that occur during the color region conversion (e.g., a transform matrix for converting content into the X, Y, Z system and a transform matrix for performing the color region conversion) into one transform matrix.

The term look-up table in this document is used to refer to any storage structure that stores values that can be retrieved by a set of index values. Different embodiments use different structures to create, organize and index their look-up tables.

II. COLOR CONVERSION WITHOUT LINEARIZATION

A. Color Conversion Operations

Figure 3:
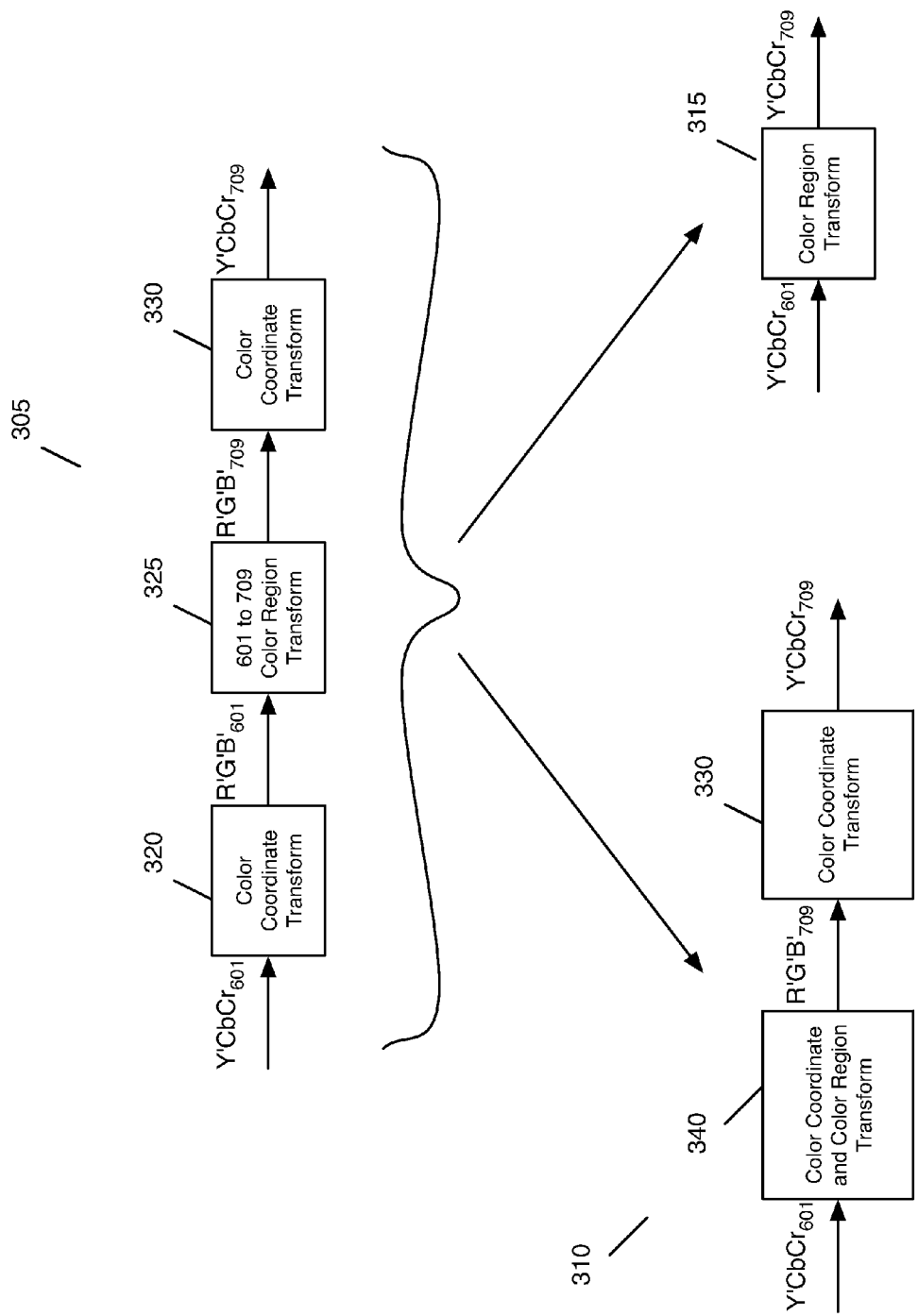
FIG. 3 illustrates three different sets of color correction operations that can each be alternatively used by some embodiments to perform color region conversion without a linearization operation.

As mentioned above, some embodiments convert the color of an image from one color region (e.g., from a Rec. 601 color region) to another color region (e.g., to a Rec. 709 color region) without performing a linearization operation to linearize the color component values of the image before performing the color region conversion. FIG. 3 illustrates three different sets of color conversion operations 305, 310 and 315 that can each be alternatively used by some embodiments to perform color region conversion without a linearization operation. Two of these sets of operations 310 and 315 are condensed versions of the other set of operations 305. Accordingly, the set of operations 305 is first described before describing the other two sets of operations 310 and 315.

The first set of operations 305 includes three color operations 320, 325, and 330 that the color processing system of some embodiments perform to convert the color of a video stream from the Rec. 601 standard definition color region to the Rec. 709 high definition color region. The first operation is a color coordinate system transform operation 320 that transforms the color of each received video frame from a Rec. 601 Y'CbCr format to a Rec. 601 R'G'B' format. In the received video, the brightness component is a luma component Y', which is the weighted sum of the gamma-compressed R'G'B' components of a color video. The non-linear, gamma encoding of the luma value causes the RGB color components that result from the color coordinate transform operation 320 to also be non-linearly gamma encoded (which, in FIG. 3, is indicated as $R'G'B'_{601}$).

In some embodiments, the color coordinate transform operation 320 is performed by applying a 3×3 transform matrix to the three color components (Y'CbCr) of each pixel of each received video frame. This 3×3 transform matrix changes the representation of the color values of each video-frame pixel from a Y'CbCr format to an R'G'B' format.

The second operation is a color region conversion operation 325. This operation takes the colors of the video stream from the color coordinate transform operation 320 and transforms them from the Rec. 601 color region to the Rec. 709 color region (i.e., converts the $R'G'B'_{601}$ pixel color values of each video frame it receives to the $R'G'B'_{709}$ pixel color values). In other words, this operation 325 performs a gamut mapping operation that ensures that the colors of each video frame that are output from the coordinate transform operation 320 are adjusted to be in the Rec. 709 color region.

In some embodiments, the color region conversion operation 320 is performed by applying a 3×3 transform matrix to the three color components (R'G'B') of each pixel of each video frame that are output by the color coordinate transform operation 320. The elements of the 3×3 transform matrix are chosen to scale, move, rotate and/or otherwise adjust the Rec. 601 color region to the Rec. 709 color region with minimal loss of color fidelity from the first color region. Also, as further described below in sub-section II.B, these elements are also chosen in some embodiments to compensate for performing the color region conversion without the linearization operation. As further described below, the matrix elements in some embodiments are defined to minimize the difference between (1) the desired, converted color values in the second color region and (2) the actual color values that are produced in the second color region by the color conversion process that foregoes the linearization operation.

After the color region conversion 325, the third color operation 330 is performed. This operation is a color coordinate transform operation 330 that is performed on the R'G'B'$_{709}$ video content that is output from the color region conversion 325. This color coordinate transform operation 330 converts the color coordinate system of this output from the R'G'B'$_{709}$ format into a Y'CbCr$_{709}$ format.

In some embodiments, the color coordinate transform operation 330 is performed by applying a 3×3 transform matrix to the three color components (R'G'B') of each pixel of each received video frame that is output by the color region conversion operation 325. This 3×3 transform matrix changes the representation of the color values of each video-frame pixel from an R'G'B' format to a Y'CbCr format.

By foregoing the linearization operation and the subsequent gamma operation in the color adjustment operations 305, some embodiments can perform color correction operations quicker. These embodiments can also forego specialty hardware that is often needed to perform the linearization and gamma operations quickly. One example of such hardware is a separate GPU for performing the linearization and gamma operations.

Instead of performing the set of color adjustment operations 305, the color system of some embodiments performs the set of color adjustment operations 310. The color adjustment set 310 is equivalent to the color adjustment set 305. The color adjustment set 310 includes two operations 330 and 340. Operation 330 is a color coordinate transform operation that is identical to the similarly numbered operation in the set of color adjustment operations 305.

Operation 340 combines the color coordinate transform and the color region conversion operations 320 and 325 in a lossless manner relative to the set of color adjustment operations 305. As mentioned above, some embodiments use 3×3 transform matrices to perform the color coordinate transform 320 and the color region conversion 325 in the color adjustment set 305. Some embodiments combine the color coordinate transform 320 and the color region conversion 325 into one operation 340 that is performed through one 3×3 matrix. This 3×3 matrix is obtained by multiplying the 3×3 matrices of the color coordinate transform 320 and the color region conversion 325 together.

In some embodiments, the color system combines all three color adjustment operations 320, 325 and 330 into a single color adjustment operation 315. This operation combines the color coordinate transform 320, the color region conversion operation 325, and the color coordinate transform 330 in a lossless manner, by multiplying together the 3×3 matrices that are used to perform these operations in some embodiments.

Even though a single transform operation 315 can perform all three transform operations 320, 325 and 330, some embodiments do not use this transform operation and instead use the second color adjustment pipeline 310 that is formed by the color adjustment operations 340 and 330. These embodiments use this pipeline 310 because they perform compositing operations on the RGB formatted (e.g., on R'G'B'$_{709}$) video content that is output from the color coordinate/region transform 340. For certain applications, it is beneficial to perform the video compositing (e.g., to add image content to video) in the RGB format. Accordingly, these embodiments use one combined 3×3 matrix to perform the color coordinate/region transform 340, then perform compositing on the R'G'B' content, and then convert the composite video content to the Y'CbCr format by using the color coordinate transform 330. Performing compositing operations in the RGB domain during the color adjustment operations will be further described below in sub-section II.C.

B. Defining Color Region Conversion Matrix to Account for Non-Linear Color Values of Input Video To compensate for performing the color region conversion without the linearization operation, some embodiments define the elements of the transform matrix that is used to perform the color region conversion to account for the fact that the color region conversion is performed on video data that is in a non-linear color domain. Specifically, in some embodiments, the matrix elements are defined to minimize the difference between the desired, converted color values in the Rec. 709 color region and the actual color values that are produced in the Rec. 709 color region by the color conversion process that foregoes linearization.

Figure 4:
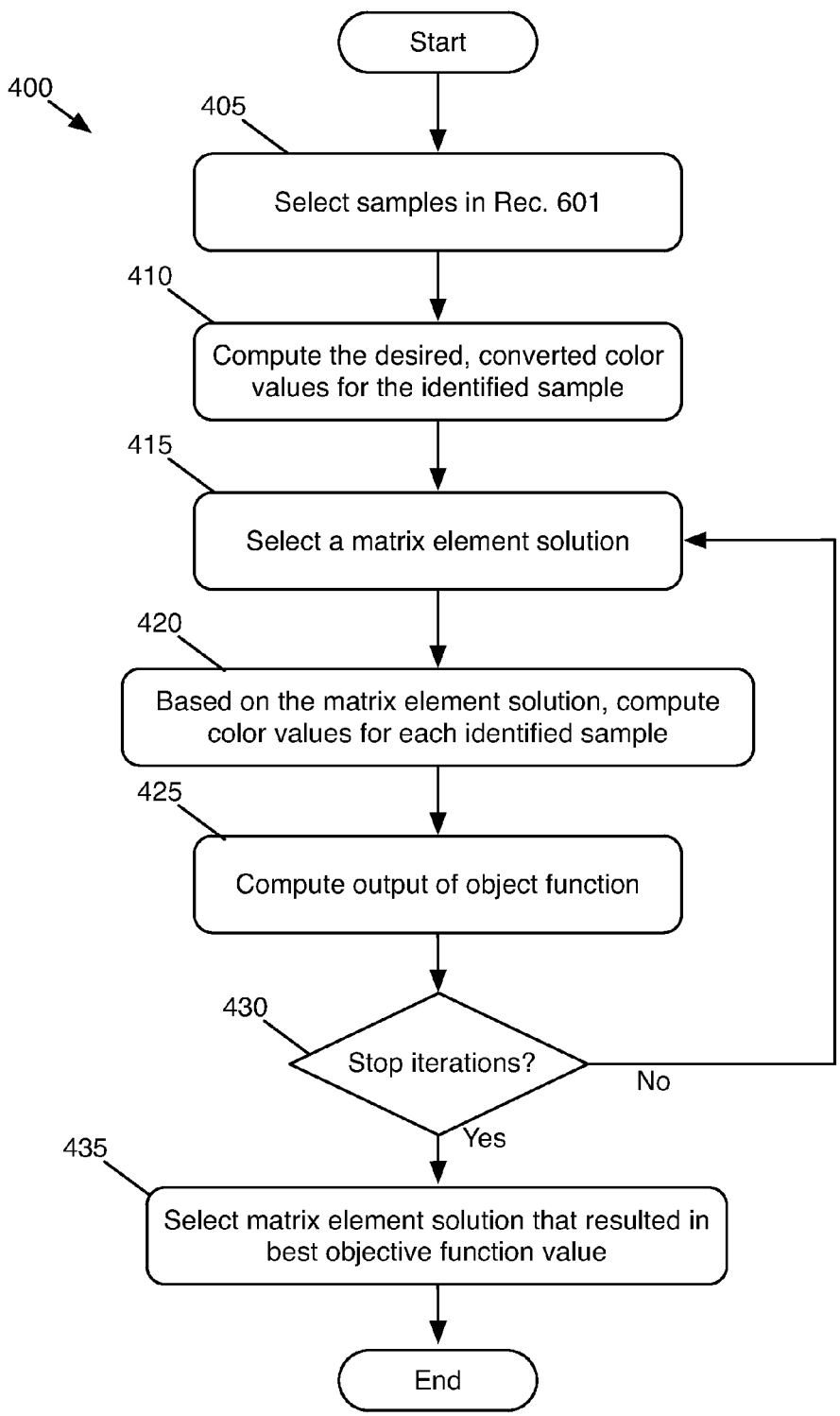
FIG. 4 conceptually illustrates an optimization process that is used in some embodiments to define the transform color conversion matrix.
Figure 5:
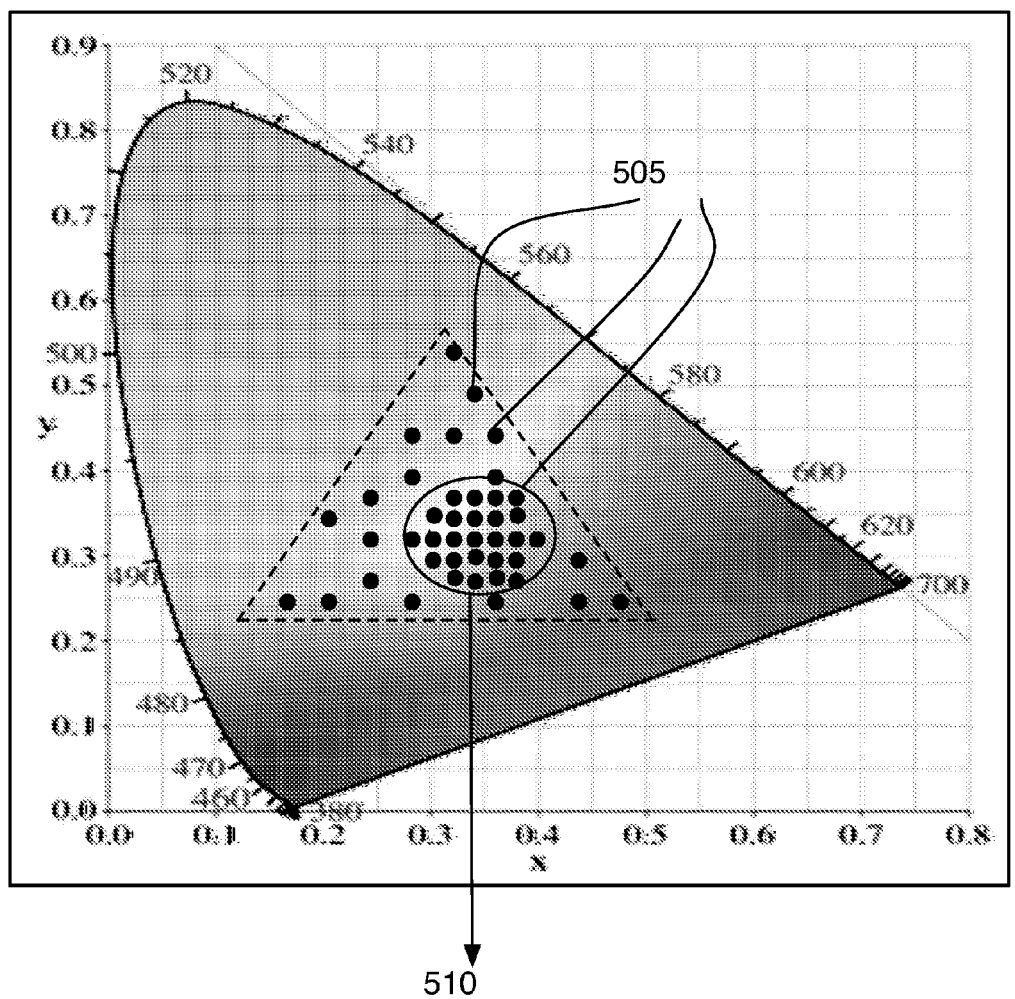
FIG. 5 illustrates that some embodiments select more sample points in the sub-region 510 corresponding to skin tones in the Rec. 601 color region.

FIG. 4 illustrates an optimization process 400 that is used in some embodiments to define the transform color conversion matrix. As shown in this figure, the process initially identifies (at 405) several samples in the Rec. 601 color region. FIG. 5 illustrates several color samples 505 that are specified in the Rec. 601 color gamut.

After identifying these samples, the optimization process computes (at 410) for these samples, the desired, converted color values through a color conversion process that performs the linearization and gamma correction operations. One example of such a color conversion process is the set of color conversion operations 200 that are illustrated in FIG. 2. In some embodiments that use the color conversion process 200, the desired, converted color values for the identified samples are the R'G'B'$_{709}$ color values output from the gamma operator 220, while in other embodiments they are the Y'CbCr$_{709}$ values output from the color coordinate transform operation 225.

After identifying the desired, converted color values for the identified samples in the Rec. 601 color region, these embodiments then iterate through the solution space of available matrix element values to identify one set of matrix element values that minimizes the difference between the desired, converted color values and the color values obtained through the color conversion process that foregoes linearization.

Specifically, at 415, the process 400 identifies one solution of matrix element values. As mentioned above by reference to FIG. 3, different embodiments use different color conversion processes that forego linearization. In some embodiments that use the set of color adjustment operations 305, the matrix element solution identified at 415 specifies nine values that form the 3×3 transform matrix that performs the color region conversion operation 325. On the other hand, when the set of color adjustment operations 310 are used, the matrix element solution identified at 415 either (1) in some embodiments, specifies nine values that form the 3×3 transform matrix that performs the color region conversion operation 325 (which would later have to be multiplied by the 3×3 transform 320 to obtain the 3×3 transform 340, as further described below), or (2) in some embodiments, specifies nine values that form the 3×3 transform matrix that performs the color coordinate/region conversion operation 340. Similarly, when the color adjustment operation 315 is used, the matrix element solution identified at 415 either (1) in some embodiments, specifies nine values that form the 3×3 transform matrix that perform the color region conversion operation 325 (which would later have to be multiplied by the 3×3 transforms 320 and 330 to obtain the 3×3 transform 315, as further described below), or (2) in some embodiments, specifies nine values that form the 3×3 transform matrix that performs the color coordinate/region conversion operation 315.

Next, the process computes (at 420) the color values for the identified samples through a color conversion process that foregoes linearization. As mentioned above, different embodiments use different color conversion processes that forego linearization. In some embodiments that use the set of color adjustment operations 305, the color values computed at 420 for the identified samples are either the R'G'B'$_{709}$ color values output from the color coordinate transform 325 or the Y'CbCr$_{709}$ color values output from the color coordinate transform 330. Which one of these sets of color values are used depends on which format the optimization process uses to represent the desired, converted color values at 410 (e.g., depends on whether the R'G'B'$_{709}$ color values output from the color coordinate transform 325 or the Y'CbCr$_{709}$ values output from the color coordinate transform operation 330 are used).

Similarly, when the set of color adjustment operations 310 are used at 420, the computed color values are either the R'G'B'$_{709}$ color values output from the color coordinate/region transform 340 or the Y'CbCr$_{709}$ values output from the color coordinate transform operation 330, depending on the format the process used at 410. When the color adjustment operation 315 is used, the computed color values are the Y'CbCr$_{709}$ values output from this operation.

Next, at 425, the process computes the value of an objective function that expresses the difference between the desired, converted color values and the color values obtained through the color conversion process that foregoes linearization. In some embodiments, the objective function is expressed as:

$$F = \sum_{i=1}^{n} \text{abs}(R_i^D - R_i^A) + \text{abs}(G_i^D - G_i^A) + \text{abs}(B_i^D - B_i^A), \quad (1)$$

where n is the number of identified samples, $R_i^D$, $G_i^D$, and $B_i^D$ are the desired RGB values for the $i^{th}$ sample, and $R_i^A$, $G_i^A$, and $B_i^A$ are the RGB values computed for the $i^{th}$ sample by using a color conversion process that foregoes the linearization process. Equation (1) expresses an objective function that should be minimized in order to identify an optimal solution. Other embodiments express the objective function differently. For instance, instead of taking the absolute value of the differences between the desired and actual values as in the above equation (1), some embodiments square this difference. Also, instead of amalgamating the differences between the desired and actual values in each color channel by adding these differences, other embodiments multiply these differences. Alternatively, instead of using an objective function (like equation (1)) that needs to be minimized to identify an optimal solution, some embodiments use an objective function that needs to be maximized to identify the optimal solution. One such objective function could be specified by inverting the function of equation (1) and multiplying it by a scalar value. Still other forms of the objective function are possible.

After computing the objective function at 425, the process determines (at 430) whether it should stop its search for a matrix element solution that optimizes (e.g., minimizes) the objective function. This determination can be based on the number of iterations, the duration of execution of the process, etc. Different embodiments perform this determination differently based on the optimization technique that they use to explore the solution space. Examples of such techniques include hill climbing, simulated annealing, etc. Each of these techniques has a different set of criteria for ending the search through the solution space. In some embodiments, the iterations terminate when the process identifies a matrix solution that produces color values that closely match the desired color values computed at 410.

When the process determines (at 430) that it should not terminate its search, it returns to 415 to select another matrix element solution and repeat its operations 420 and 425 to compute the objective function value for this solution. Different embodiments select matrix solutions upon return to 415 differently. In some embodiments, the process 400 selects the matrix solution in accordance with the optimization technique that it uses to search for a matrix solution that produces color values that closely match the desired color values. In some embodiments, each new matrix solution is randomly generated. Also, the process 400 of some embodiments explores various solutions, but only accepts some of the solutions as its current best solution from which it explores other solutions. In some of these embodiments, the process explores the solution space for the matrix by accepting solutions that result in objective function scores that are worse than the previously accepted solutions but accepts fewer worse performing solutions, and/or decreases the extent to which an acceptable solution can have a worse score than a previous solution, as the number of its iterations increases.

On the other hand, when the process determines (at 430) that it should terminate its search, it transitions to 435. At 435, the process designates the color conversion matrix 305, 310 or 315 as the matrix solution that it has identified in its iterations through 415-430 as the solution that resulted in the best objective function value (e.g., as the solution that produced the smallest objective function value). For some optimization techniques that are used in some embodiments, the solution that is identified at 435 as the solution that resulted in the best objective function value, is the last solution that the process 400 accepted after computing its object function score while iterating through the operations 415-430. After 435, the process ends.

Some embodiments further optimize the process 400 by selecting (at 405) more sample points from the sub-region or sub-regions of interest in the Rec. 601 color region than from the other sub-regions within this color region. For example, as shown in FIG. 5, some embodiments select more sample points in the sub-region 510 corresponding to skin tones in the Rec. 601 color region. The selection of more sample points from a sub-region of interest causes the optimization process 400 to be biased in favor of producing good quality color conversion for color values that fall within sub-region(s) of interest. For instance, by selecting more sample points in the sub-region corresponding to skin tones, the optimization process can increase the likelihood that the color region conversion that is subsequently performed will more accurately convert skin tones from the Rec. 601 domain to the Rec. 709 domain.

Figure 6:
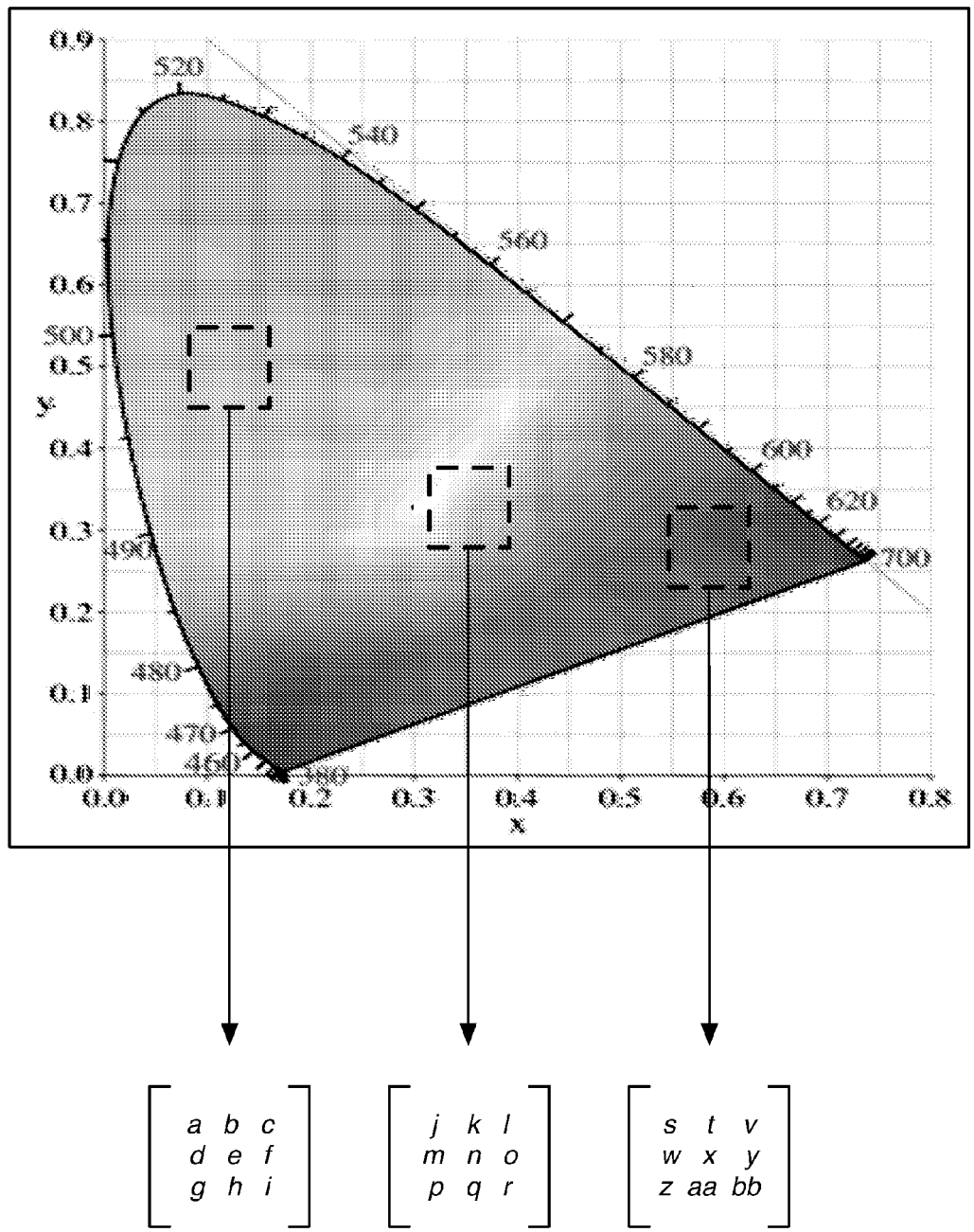
FIG. 6 illustrates that some embodiments generate multiple color conversion matrices that are optimized for multiple different sub-regions in the Rec. 601 color region.

Instead of selecting just one sub-region to sample more, some embodiments select multiple sub-regions for greater sampling. Alternatively, as shown in FIG. 6, other embodiments generate multiple color conversion matrices that are optimized for multiple different sub-regions in the Rec. 601 color region. These embodiments perform the optimization process 400 in several different iterations and in each of the iterations, the process 400 selects (at 405) a different sub-region to sample more. For instance, the sub-region can correspond to skin tones in one iteration, to foliage in another iteration, and to sky in yet another iteration.

The different color conversion matrices that are optimized for the different sub-regions can then be used during the color conversion process to provide a viewer with multiple different choices for adjusting the color conversion process. For instance, the viewer may select a setting that selects the matrix optimized for skin tones when watching a news event, a setting that selects the matrix optimized for foliage during a sporting event, or a setting that selects the matrix optimized for sky when watching a movie.

Figure 7:
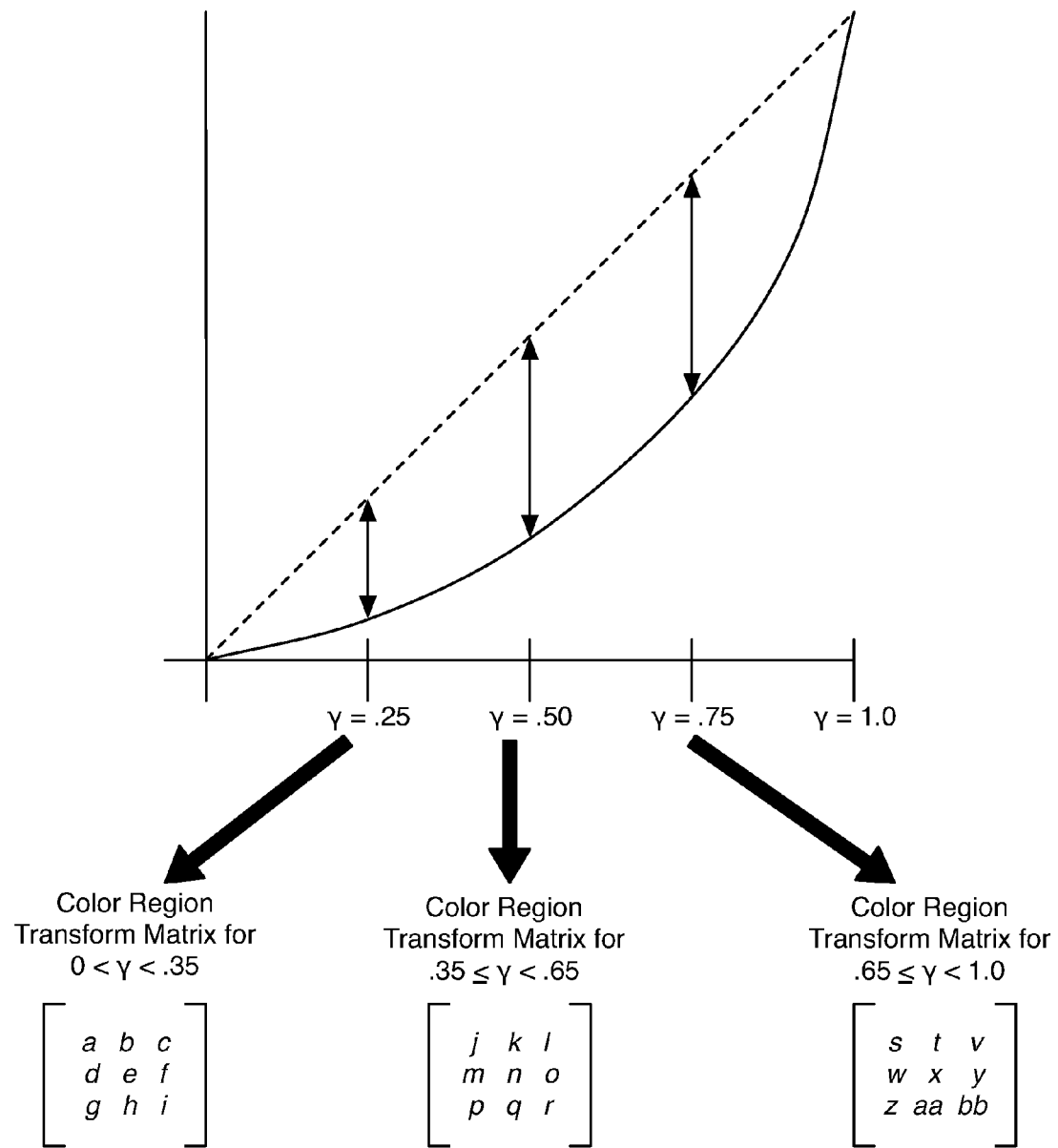
FIG. 7 illustrates that some embodiments compute multiple different color region conversion matrices for multiple different ranges of possible input luminance or luma values.

Other embodiments provide other techniques for defining the color region conversion matrix with particularity. For instance, as shown in FIG. 7, some embodiments compute multiple different color region conversion matrices for multiple different ranges of possible input luminance or luma values, and then use these different matrices to color-region convert the pixel color values that fall within the different luminance or luma ranges. Some embodiments specify different matrices for different luminance or luma ranges because the non-linear nature of the input pixel color values is different for different luminance or luma values. Specifying different color region conversion matrices for different ranges provides one way of reducing the non-linear distortion that is caused by not performing a linearization operation before the color region conversion operation.

C. Video Processing System

Figure 8A:
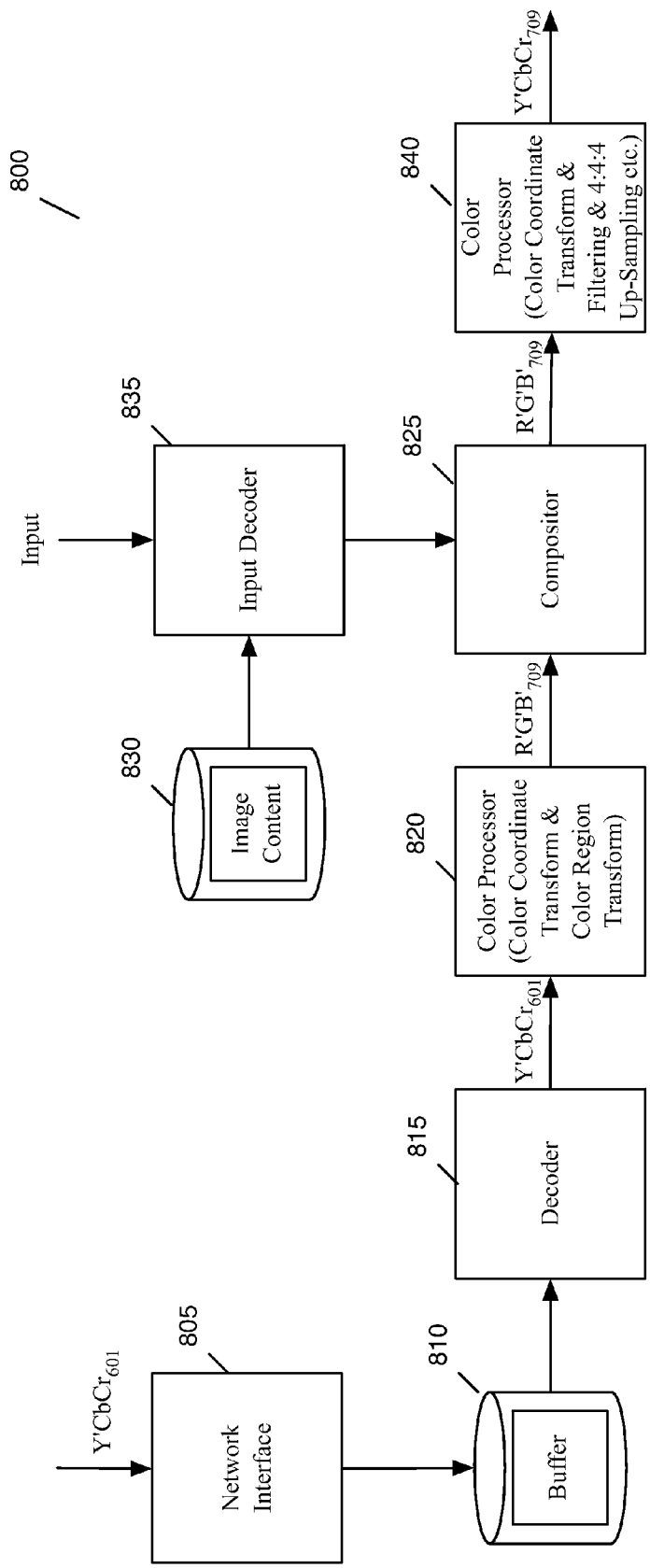
FIG. 8A illustrates a video processing system that uses the set of color adjustment operations of FIG. 3 with a color region conversion matrix that is defined to account for the foregoing of the linearization operation before the color region conversion.

FIG. 8A illustrates a video processing system 800 that uses the set of color adjustment operations 310 of FIG. 3 with a color region conversion matrix that is defined to account for the foregoing of the linearization operation before the color region conversion. The video processing system 800 processes a standard definition Rec. 601 video stream that is received through a network (e.g., through a telecommunication network or through the Internet) for display on a high definition television or monitor. As shown in FIG. 8A, the system 800 includes a network interface 805, a buffer 810, a decoder 815, a first color processor 820, a compositor 825, a storage 830, an input decoder 835, and a second color processor 840.

The network interface 805 communicatively connects the system 800 to a network (not shown). Through this connection, the network interface receives a video stream through the network. The received video stream is in a Y'CbCr$_{601}$ format in the example shown in this figure. As it receives the video stream, the network interface stores the stream in the buffer 810.

The decoder 815 retrieves the video stream from the buffer and decodes the video frames. It then supplies the decoded frames (typically, on a frame-by-frame basis) to the first color processor 820. On each received decoded frame, the color processor 820 performs the color coordinate/region transform operation 340 of FIG. 3. The color processor 820 converts each pixel's Y'CbCr$_{601}$ values in the retrieved frame to R'G'B'$_{709}$ values by using a 3×3 matrix that is specifically defined to account for the foregoing of the linearization operation. In some embodiments, the 3×3 matrix is the color conversion matrix that is identified by the process 400 of FIG. 4, multiplied by a 3×3 matrix that performs a color coordinate transform from Y'CbCr format to an R'G'B' format. In some embodiments, the first color processor 820 receives the Y'CbCr$_{601}$ values in a 4:2:2 or 4:2:0 format, and produces the R'G'B'$_{709}$ values in a 4:4:4 format.

After a video frame is processed by the first color processor 820, the compositor 825 determines whether it has to composite (i.e., combine) this video frame with any image content that it may be receiving from the input decoder 835. The input decoder 835 analyzes input that it receives to determine whether it needs to supply image content from the storage 830 to the compositor to combine with the processed video frames. The input to the decoder 835 might be input from a user or from another module of the system 800.

When the compositor determines that it has to composite the video frame with image content, it blends the frame and the image content and supplies a blended frame to the second color processor 840. On the other hand, when the compositor does not have to composite the video frame with image content, it simply supplies the video frame output by the first color processor 820 to the second color processor 840.

On each video frame that it receives from the compositor, the second color processor 840 performs the color coordinate transform operation 330 of FIG. 3 in order to convert the R'G'B'$_{709}$ format of the video frame to a Y'CbCr$_{709}$ format. In addition to the coordinate transform operation 330, the color processor 840 performs other image processing operations in some embodiments. Examples of such operations include filtering operations, scaling operations (e.g., operations that adjust the scale of video frames to match the resolution of the television), and up/down sampling operations that modify the Y'CbCr format to match the Y'CbCr format used by the television. The output of the color processor 840 is supplied to the output display.

D. Process

Figure 8B:
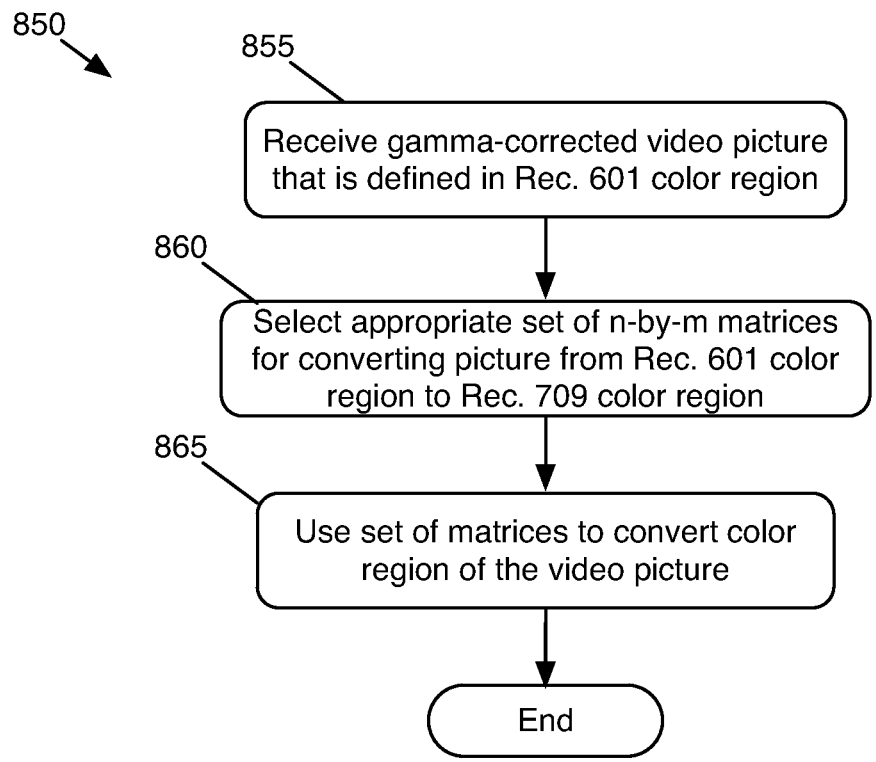
FIG. 8B conceptually illustrates a process of some embodiments for converting the color region of each image of a received video from Rec. 601 color region to a Rec. 709 color region.

FIG. 8B illustrates a process 850 of some embodiments of the invention. In some embodiments, the system 800 of FIG. 8A uses the process 850 repeatedly to convert the color region of each picture of a received video from Rec. 601 color region to a Rec. 709 color region. As shown in FIG. 8B, the process 850 starts (at 855) when it receives a gamma-corrected video picture (e.g., video frame or field) that is defined in Rec. 601 color region.

The process then selects (at 860) a set of n-by-m matrices for converting the received video picture from Rec. 601 color region to Rec. 709 color region. As mentioned above, some embodiments use one or more different matrices to perform this color region conversion. Examples of such matrices are matrices that are generally defined for all pixel values, matrices that are specifically defined for different luma ranges, matrices that are optimized for different sub-regions of interest, etc. Several such matrices were discussed above by reference to FIGS. 3-7.

At 865, the process uses the selected set of matrices to convert the component color values of the video picture from a Rec. 601 color region to a Rec. 709 color region. When the n-by-m matrix is a single matrix that is defined for all component color values, the process applies this matrix to the component color values of each pixel of the video picture. On the other hand, when the process identifies multiple n-by-m matrices for multiple different luma ranges, the process identifies the matrix for each pixel based on the pixel's luma value, and then applies this matrix to the pixel's component color values to color-region convert these values. After 865, the process ends.

III. LOOK UP TABLE APPROACH

To convert video color component values that are defined in a Rec. 601 color region to a Rec. 709 color region, some embodiments (1) pre-tabulate the converted, Rec. 709 color component values for some or all possible color component values in the Rec. 601 color region, and (2) store these pre-tabulated values in a look-up table (LUT). When converting the colors of a video frame, the storage structure can then be accessed to convert the component color values of each pixel in each video frame from the Rec. 601 color region to the Rec. 709 color region.

Figure 9:
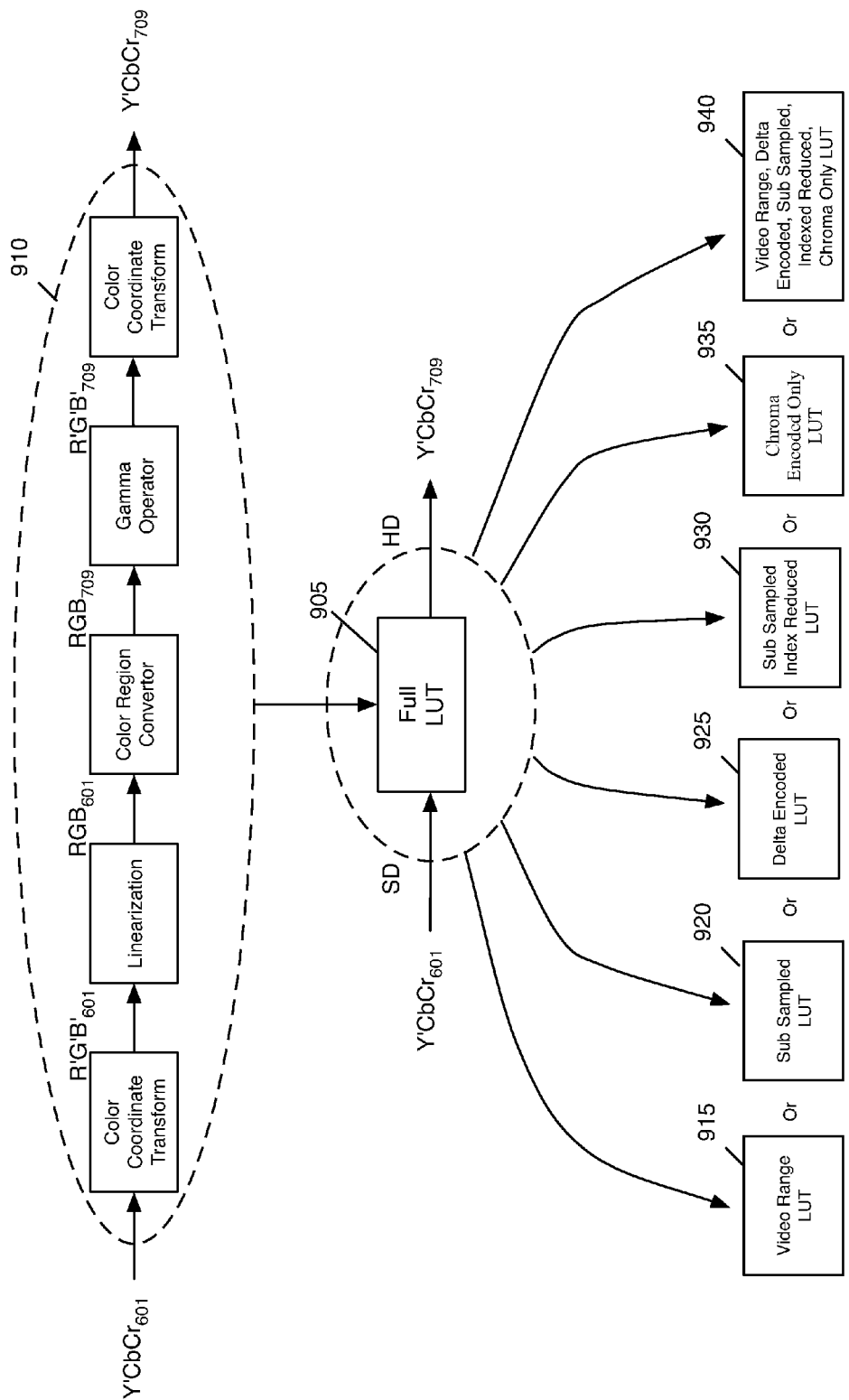
FIG. 9 illustrates a pre-tabulation approach of some embodiments and several different LUTs that are employed by several different embodiments to implement this pre-tabulation approach.

FIG. 9 illustrates the pre-tabulation approach of some of these embodiments. Specifically, it illustrates a LUT 905 that stores pre-tabulated, converted, Rec. 709 color component values for all possible color component values in the Rec. 601 color region. As shown in FIG. 9, some embodiments compute each pre-tabulated set of color component values Y'CbCr$_{709}$ by using a color processing pipeline 910 to process one set of component color values Y'CbCr$_{601}$ in the Rec. 601 color region. This color processing pipeline 910 is similar to the color processing pipeline 200 of FIG. 2, which uses the linearization operation 210 and the gamma correction operation 220.

FIG. 9 also illustrates that some embodiments employ one or more techniques to reduce the size of the storage structure and improve performance. Some embodiments reduce the size of the LUT to make it faster to access the LUT during the color conversion. Also, a smaller LUT is more likely to be able to fit inside the L2 cache of the color-conversion system's microprocessor that performs the color conversion operation. Having the LUT inside this cache increases the speed and efficiency of the microprocessor's color conversion operation.

One way of reducing the size of the LUT is to store component color values for color samples in the video range, as illustrated by LUT 915 of FIG. 9, instead of storing converted color component values for each possible color sample in the Rec. 601 color region. Instead of or in conjunction with this technique, some embodiments only store a sub-sample of component color values (i.e., store component color values for some but not all color samples) that might be needed when color-region converting the colors of a set of images, as illustrated by LUT 920 of FIG. 9. When the color conversion method of these embodiments encounters a particular pixel's component color sample for which it does not have a stored set of component color values, the method (1) retrieves several sets of component color values that are stored for several color samples that are near the particular component color sample in the first region, (2) computes a set of component color values through an interpolation or extrapolation operation that uses the retrieved sets of component color values, and (3) assigns the component color value set to the particular pixel as its color in the Rec. 709 color region. Alternatively, when the color conversion method of these embodiments has a stored set of component color values for a particular pixel's component color sample, it uses the stored set of component color values as the component color values of the particular pixel in the Rec. 709 color region.

Instead of storing complete color component value sets, some embodiments reduce the size of the LUT by delta encoding the component color values that they store, as illustrated by delta encoded LUT 925 of FIG. 9. Delta encoding the component color values entails only storing delta color component value sets. A delta color component set is a set of component color values that are meant to be applied (e.g., added) to a pixel's color component values to convert the pixel's color from the first region to the second region. When a pixel's color component values in the first region are viewed as a vector that define the pixel's color in a multi-dimensional color coordinate system, the delta color component set can be viewed as a color transform vector that is to be applied to the pixel's color component values to express this pixel's color in the second region. Some embodiments combine the sub-sampling and delta-encoding techniques by storing only a sub-sample of the delta encoded component color values that might be needed when color-region converting the video.

In storing only a sub-sample of values, some embodiments further reduce the size of the LUT by reducing the number of bits used to index this structure, as illustrated by LUT 930 of FIG. 9. For instance, to index a LUT that stores full or delta encoded component color values for three color components, some embodiments use n-bits (e.g., 8 bits) to express each particular color component but less than n-bits (e.g., 5 bits) to index the LUT for the particular color component's converted value.

In conjunction with or instead of the sub-sampling, delta encoding, and/or other LUT reduction techniques, some embodiments reduce the number of accesses to the LUT by only storing values for color-region converting the chrominance/chroma values and not the luminance or luma values, as indicated by LUT 935 of FIG. 9. These embodiments assume that in performing the color conversion, the luminance or luma values will not be changed or, if changed, the change will be very slight. Accordingly, these embodiments store color conversion values for only converting the chrominance/chroma values.

Lastly, as indicated by LUT 940, some embodiments use a sub-sampled, delta-encoded, index-reduced, chroma-encoded, video-range LUT.

Each of these types of LUTs is further described below.

A. Full and Video Range LUTs

Figure 10:
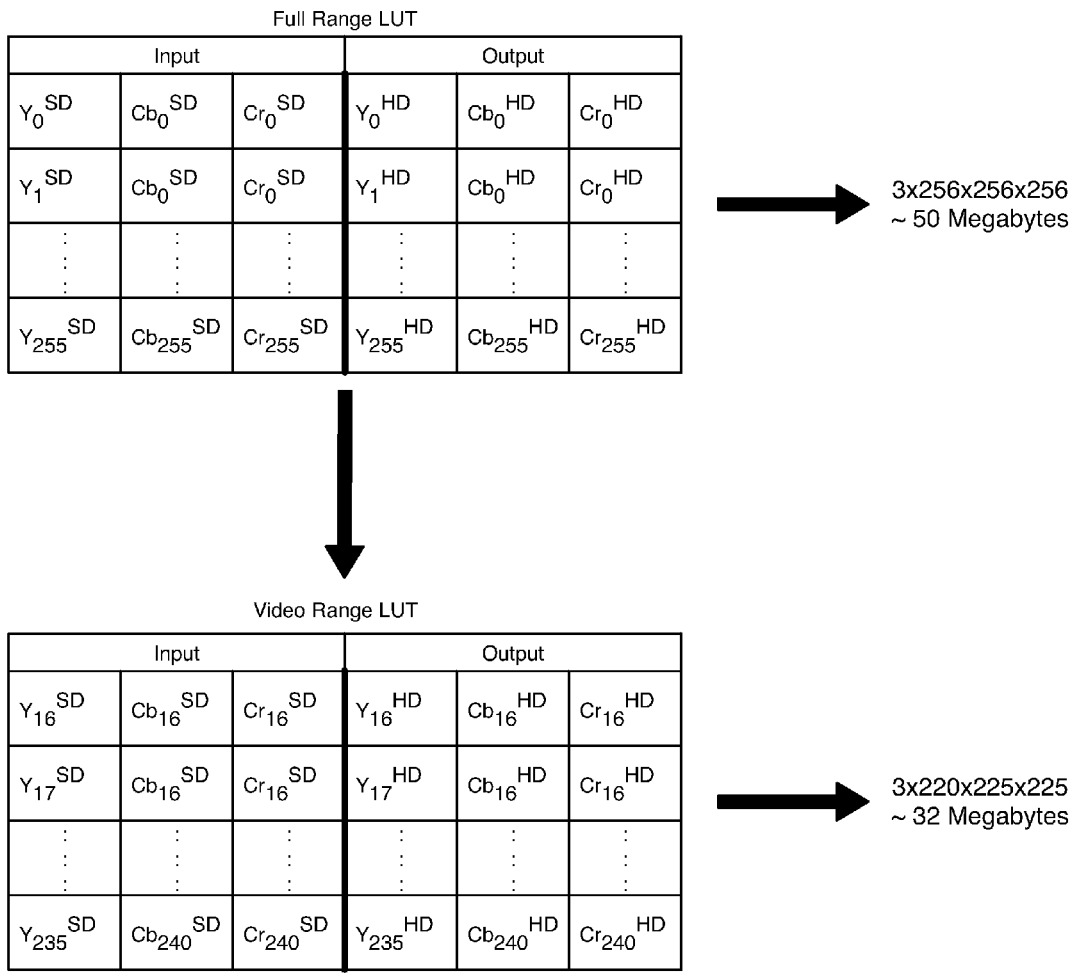
FIG. 10 illustrates that some embodiments utilize a full LUT that stores pre-tabulated converted, Rec. 709 color component values for all possible color component values in the Rec. 601 color region.

Some embodiments utilize a full LUT that stores pre-tabulated, converted Rec. 709 color component values for all possible color component values in the Rec. 601 color region. As shown in FIG. 10, the size of such a LUT would be about 50 MB when eight bits are used to represent each color component (i.e., would be $3 \times 2^8 \times 2^8 \times 2^8$). For some color conversion systems, this LUT size is too large. For instance, this size is typically larger than the size of the processor's L2 cache and hence prevents this LUT from being loaded in the L2 cache.

For 8-bit component color values, the size of the LUT can be reduced to about 32 MB (i.e., can be reduced to $3 \times (235-16) \times (240-16) \times (240-16)$) by storing component color values for color samples only in the video range, as further shown in this figure. This is more than a 35% reduction in LUT size by storing component color values for the range of color values that are simply needed for the video conversion process. However, a 32 MB LUT size might be still too large for some color conversion systems, such as those that are designed to store the LUT in the L2 cache of the processor. Accordingly, the color conversion systems of some embodiments employ other techniques to reduce the size of the LUT.

B. Sub-Sampled and Reduced Indexed LUTs

Figure 11:
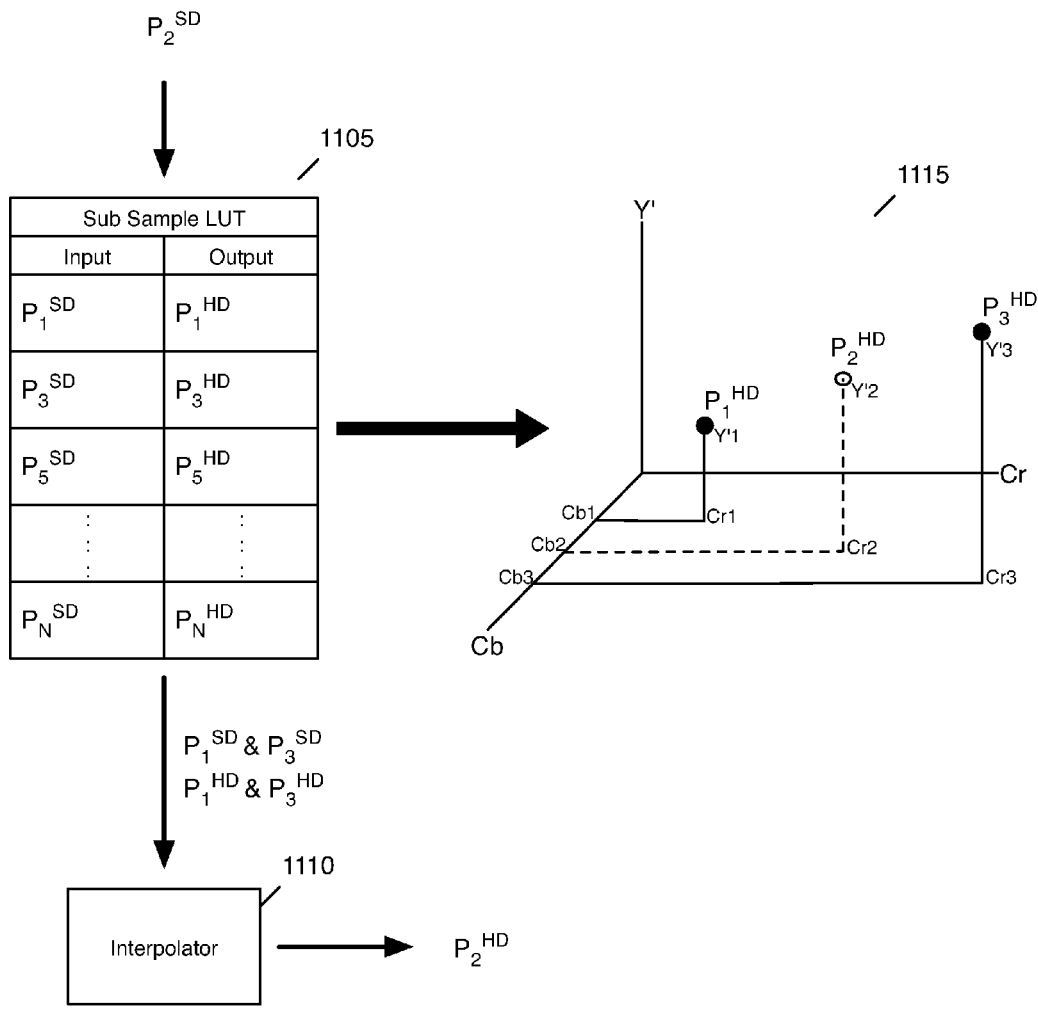
FIG. 11 illustrates that some embodiments only store a sub-sample of component color values that might be needed when color-region converting the colors of a set of images.

Some embodiments only store a sub-sample of component color values (i.e., store component color values for some but not all color samples) that might be needed when color-region converting the colors of a set of images. FIG. 11 illustrates one such approach. Specifically, this figure illustrates a LUT 1105 that stores a sub-sample of component color values that are needed to convert Rec. 601 component color values in the video range. In this figure, each sub-sample is identified as a component color value set $P_i^{SD}$ (e.g., a Y'CbCr set of component color values), where the subscript i defines the set's number and the superscript indicates that this set specifies a standard definition color in the Rec. 601 domain. As shown in FIG. 11, the LUT does not store successive component color value sets but rather stores some of the component value sets (e.g., stores only sets 1, 3, 5, etc. and not sets 2 and 4).

When the color conversion system of these embodiments encounters a particular component color set for which it does not have a stored set of component color values, it has to interpolate the converted color values for the particular set from the converted color values that it stores. FIG. 11 illustrates the example of accessing the LUT to retrieve converted color values for a component color value set $P_2^{SD}$. However, given that the LUT 1105 does not store a converted, component color value set for the color set $P_2^{SD}$, the LUT supplies to an interpolator 1110 converted, component color value sets $P_1^{HD}$ and $P_3^{HD}$ for the color sets $P_1^{SD}$ and $P_3^{SD}$. Color sets $P_1^{SD}$ and $P_3^{SD}$ are nearby the color set $P_2^{SD}$ as shown in the Y'CbCr coordinate system 1115 in FIG. 11. Also, in this example, the superscript HD specifies a high definition color in the Rec. 709 domain.

From the supplied converted, component color value sets $P_1^{HD}$ and $P_3^{HD}$ for the color sets $P_1^{SD}$ and $P_3^{SD}$, the interpolator 1110 computes the converted, component color value set $P_2^{HD}$ for the received color set $P_2^{SD}$, as shown in FIG. 11. Different embodiments perform different calculations to compute the converted, component color value set (e.g., $P_2^{HD}$) from the converted, component color value sets (e.g., $P_1^{HD}$ and $P_3^{HD}$) stored in the LUT. When the neighboring color value sets bound the color set for which the converted color value set is being computed (e.g., when color sets $P_1^{SD}$ and $P_3^{SD}$ bound the color set $P_2^{SD}$), the calculation is an interpolation operation in some embodiments. On the other hand, when the neighboring color value sets do not bound the color set for which the converted color value set is being computed, the calculation is an extrapolation operation in some embodiments.

Figure 12:
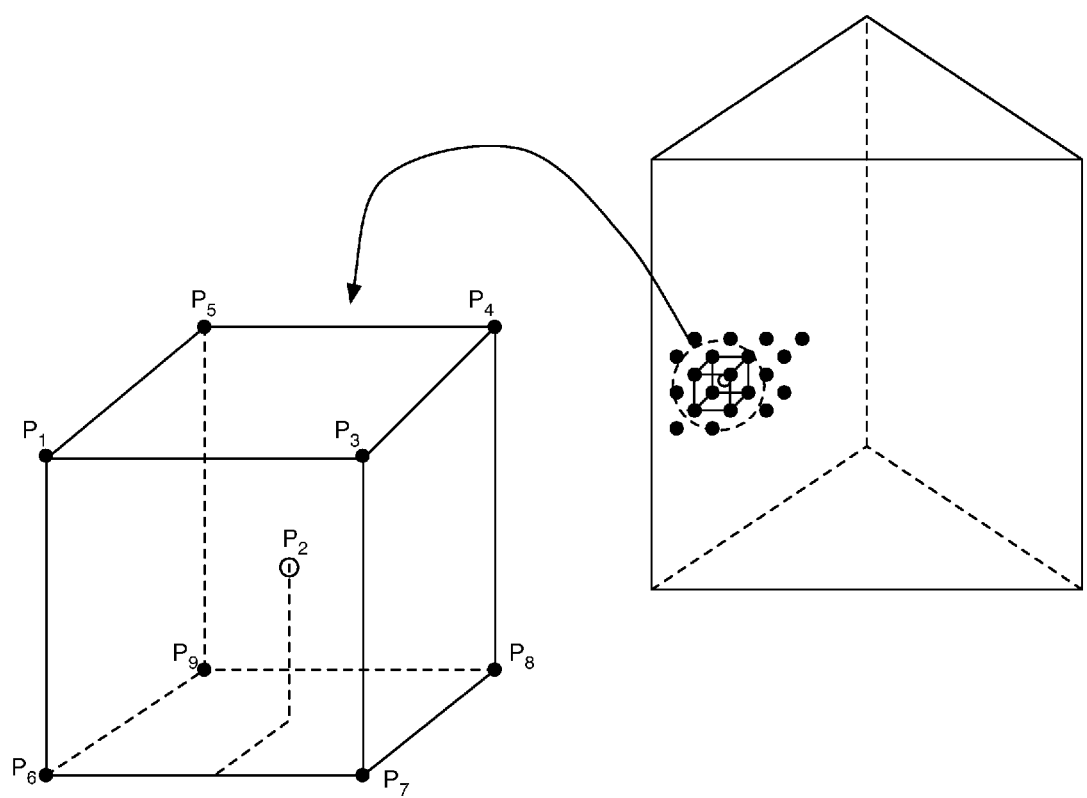
FIG. 12 illustrates that some embodiments decompose the three-dimensional Rec. 601 color space into a number of rectangular cells and then store converted, component color value sets for only the vertices of the rectangular cells.

FIG. 11 illustrates that the received color set $P_2^{SD}$ is a set of Y'CbCr color values in a three dimensional Y'CbCr coordinate system. Accordingly, to accurately compute the converted, color value set for the color set $P_2^{SD}$, some embodiments identify more than two nearby color sets for the received color set $P_2^{SD}$. As shown in FIG. 12, some embodiments decompose the three-dimensional Rec. 601 color space into a number of rectangular cells and then store converted, component color value sets for only the vertices of the rectangular cells. When the LUT in these embodiments receives a color set $P_2$ that is not one of the vertices of one of the cells, the LUT returns vertex color sets ($P_1$ and $P_3$-$P_9$) that neighbor the received color set along with the converted, color value sets that it stores for these vertices. From these returned values, the interpolator then interpolates the received color set's converted, color value set.

In storing only a sub-sample of values, some embodiments further reduce the size of the LUT by reducing the number of bits used to index this structure. For instance, to index a LUT that stores full or delta encoded component color values for three color components, some embodiments use 8-bits to express each particular color component but 5-bits to index the LUT for the particular color component's converted value. As illustrated by LUT 1305 of FIG. 13, using 5-bit index values to store sub-samples in the LUT substantially reduces the size of the LUT from 50 MB for a full LUT to only 96 KB (i.e., would be $3 \times 2^5 \times 2^5 \times 2^5$).

C. Delta Encoded LUT

Figure 14:
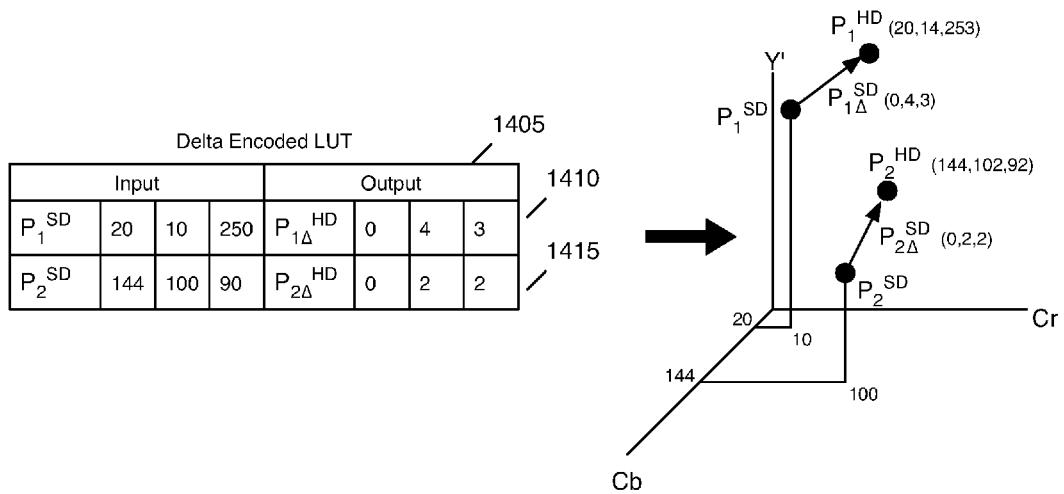
FIG. 14 illustrates that the method of some embodiments reduces the size of the LUT by delta encoding the component color values that they store.
Figure 14:
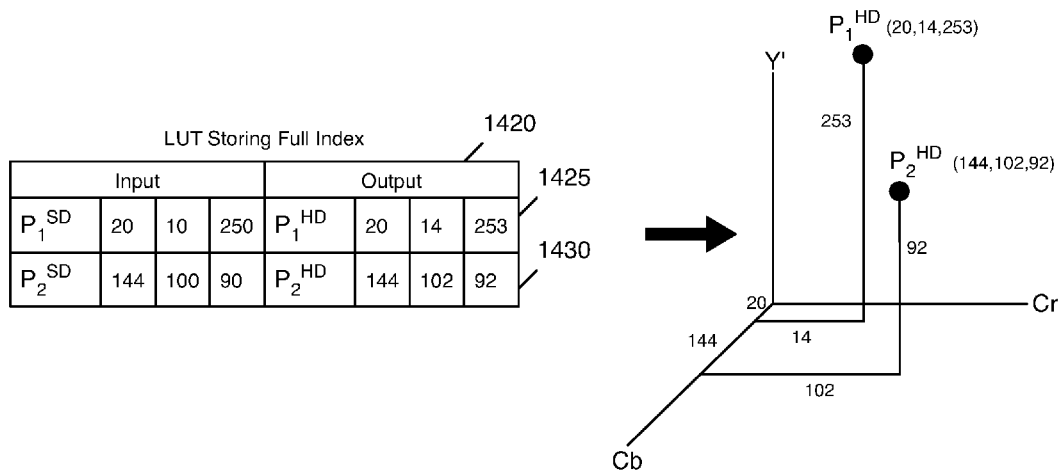

Instead of storing complete color component value sets, some embodiments reduce the size of the LUT by delta encoding the component color values that they store. FIG. 14 illustrates one such approach. Specifically, it illustrates a LUT 1405 that for two sets of input color values $P_1^{SD}$ and $P_2^{SD}$, stores two delta color component value sets 1410 and 1415. A delta color component set is a set of component color values that are meant to be applied (e.g., added) to a pixel's color component values to convert the pixel's color from the first region to the second region.

When a pixel's color component values in the Rec. 601 color region are viewed as a vector that defines the pixel's color in a Y'CbCr color coordinate system, the delta color component set can be viewed as a color transform vector that is to be applied to the pixel's color component values to express this pixel's color in the Rec. 709 region. FIG. 14 illustrates this by showing the addition of two delta vectors to the two sets of input color values $P_1^{SD}$ and $P_2^{SD}$. As shown in this figure, the addition of the delta vectors identifies two converted, component color value sets $P_1^{HD}$ and $P_2^{HD}$.

In the example illustrated in FIG. 14, the two delta vectors are (0, 4, 3) and (0, 2, 2). Small delta vectors are often the case when mapping from the Rec. 601 domain to the Rec. 709 domain. Accordingly, some embodiments use a small set of bits to specify the delta vectors. For instance, in some embodiments, the delta vectors are specified by 3 sets of 8-bits. Still other embodiments use fewer bits to specify the delta vectors.

The smaller number of bits necessary to store delta vectors is in contrast to the larger number of bits that are needed to store the converted, color component values in their entirety. To illustrate this difference, FIG. 14 illustrates a second LUT 1420 that stores converted, color component values $P_1^{HD}$ and $P_2^{HD}$ for the two sets of input color values $P_1^{SD}$ and $P_2^{SD}$ without delta encoding. In this example each component color value can be from 0 to 255, therefore 3 sets of 24-bits are needed to encode each set of component color values. If the LUT was generated using delta encoding, and if the largest delta between the input and output space was 7, then that difference could be represented in 3 bits. 3-bit delta encoding would reduce the size of the LUT from 50 MB for a full LUT to 18 MB (i.e., would be $3 \times (3/8) \times 2^8 \times 2^8 \times 2^8$).

Figure 15:
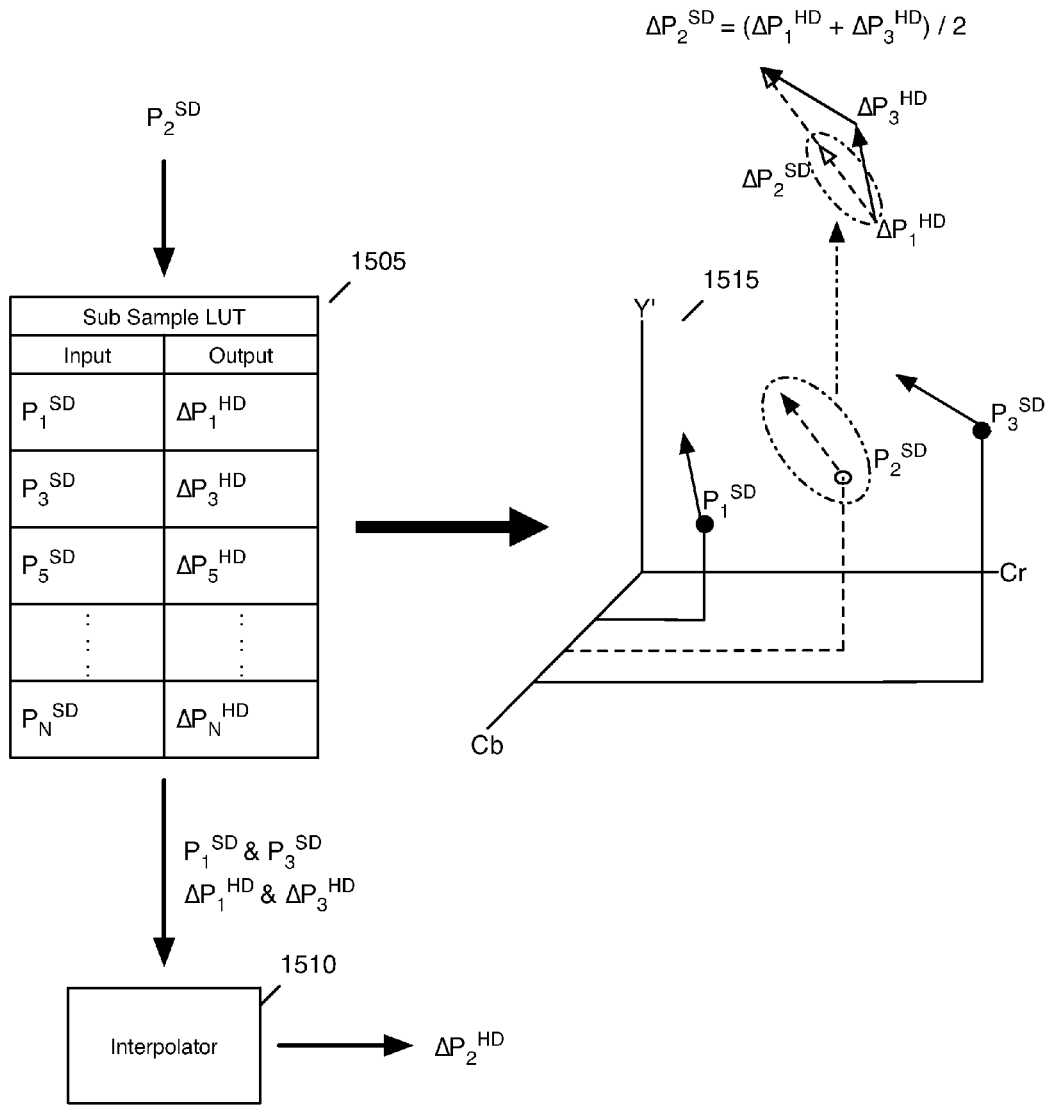
FIG. 15 illustrates how some embodiments combine the sub-sample and delta-encoding techniques by storing only a sub-sample of the delta encoded component color values that might be needed when performing color region conversions.

Some embodiments combine the sub-sample and delta-encoding techniques by storing only a sub-sample of the delta encoded component color values that might be needed when performing color region conversions. FIG. 15 illustrates one such approach. Specifically, this figure illustrates a LUT 1505 that stores delta transform vectors for a sub-sample of color values in the Rec. 601 video color domain. In this figure, each sub-sample is identified as a component color value set $P_i^{SD}$ (e.g., a Y'CbCr set of component color values), where the subscript i defines the set's number and the superscript indicates that this set specifies a standard definition color in the Rec. 601 domain. Also, each delta transform vector is specified as a $\Delta P_i^{HD}$, which represents three values that should be added to the input color component set to obtain the converted, color component values. As shown in FIG. 15, the LUT does not store successive component color value sets but rather stores some of the component value sets (e.g., stores only sets 1, 3, 5, etc. and not sets 2 and 4).

When the color conversion system of these embodiments encounters a particular pixel's component color sample for which it has a stored set of component color values, the method (1) retrieves the set of delta transform vectors that is stored for pixel's component color sample, and (2) adds each delta transform value to its corresponding component color value of the pixel to obtain the particular pixel's component color values in the Rec. 709 color region. Alternatively, when the color conversion system encounters a particular component color set for which it does not have a stored set of component color values, it has to interpolate the delta transform vector for the particular pixel from the delta transform vectors that it stores.

FIG. 15 illustrates the example of accessing the LUT to retrieve delta color values for a component color value set $P_2^{SD}$. However, given that the LUT 1505 does not store a delta, component color value set for the color set $P_2^{SD}$, the LUT supplies to an interpolator 1510 delta transform vectors $\Delta P_1^{HD}$ and $\Delta P_3^{HD}$ for the color sets $P_1^{SD}$ and $P_3^{SD}$. Color sets $P_1^{SD}$ and $P_3^{SD}$ are nearby the color set $P_2^{SD}$ as shown in the Y'CbCr coordinate system 1515 in FIG. 15. Also, in this example, the superscript HD specifies a high definition color in the Rec. 709 domain.

From the supplied delta transform vectors $\Delta P_1^{HD}$ and $\Delta P_3^{HD}$ for the color sets $P_1^{SD}$ and $P_3^{SD}$, the interpolator 1510 computes the converted, component color value set $P_2^{HD}$ for the received color set $P_2^{SD}$. FIG. 15 shows that some embodiments perform this computation by first generating a delta transform vector $\Delta P_2^{HD}$ for $P_2^{SD}$ by summing the two vectors $\Delta P_1^{HD}$ and $\Delta P_3^{HD}$ and then dividing the resulting vector by two. These embodiments then add the delta transform vector $\Delta P_2^{HD}$ to the vector specified by the component color set $P_2^{SD}$ to obtain the converted, component color set $P_2^{HD}$.

FIG. 15 also illustrates that the received color set $P_2^{SD}$ is a set of Y'CbCr color values in a three dimensional Y'CbCr coordinate system. Accordingly, to accurately compute the converted, color value set for the color set $P_2^{SD}$, some embodiments identify more than two nearby color sets for the received color set $P_2^{SD}$.

Figure 16:
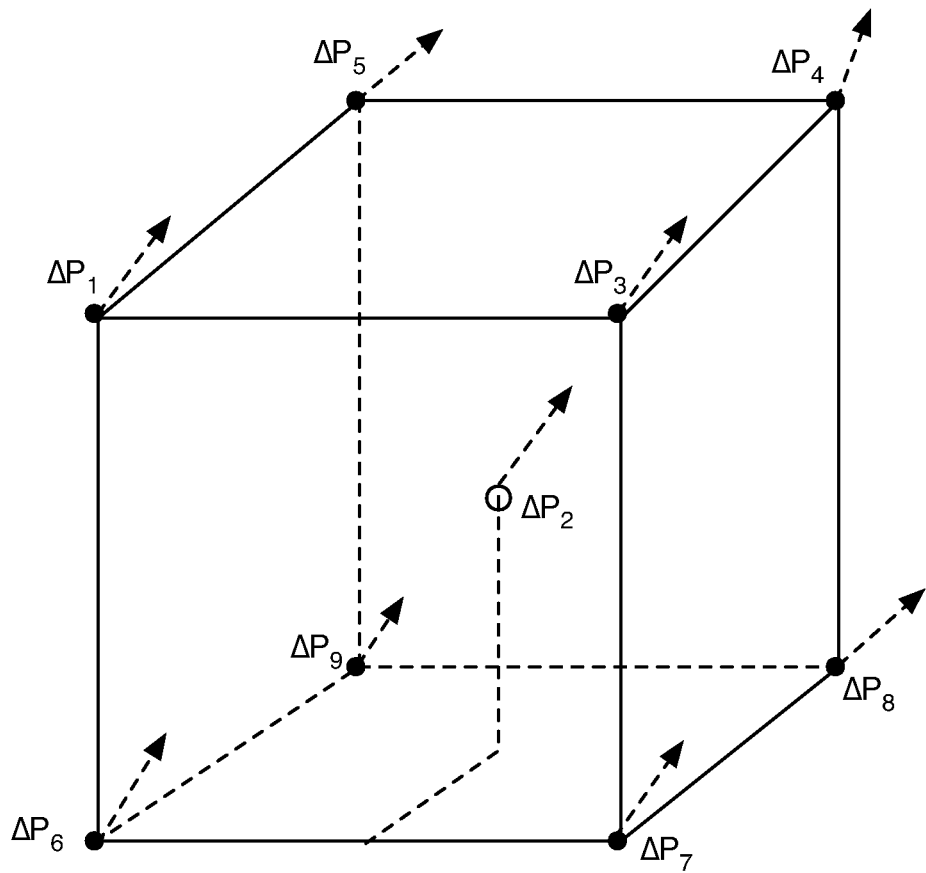
FIG. 16 illustrates that some embodiments decompose the three-dimensional Rec. 601 color space into a number of rectangular cells and then store delta transform vectors for only the vertices of the rectangular cells.

As shown in FIG. 16, some embodiments decompose the three-dimensional Rec. 601 color space into a number of rectangular cells and then store delta transform vectors for only the vertices of the rectangular cells. When the LUT in these embodiments receives a color set $P_2$ that is not one of the vertices of one of the cells, the LUT returns delta transform vectors for the eight neighboring vertices. From these returned values, the interpolator then interpolates the received color set's converted, color value set. Some embodiments reduce the size of the LUT further by storing only one delta transform vector for each rectangular cell or each of several rectangular cells, based on the assumption that all the color values that fall within the cell will have to be adjusted similarly.

Figure 17:
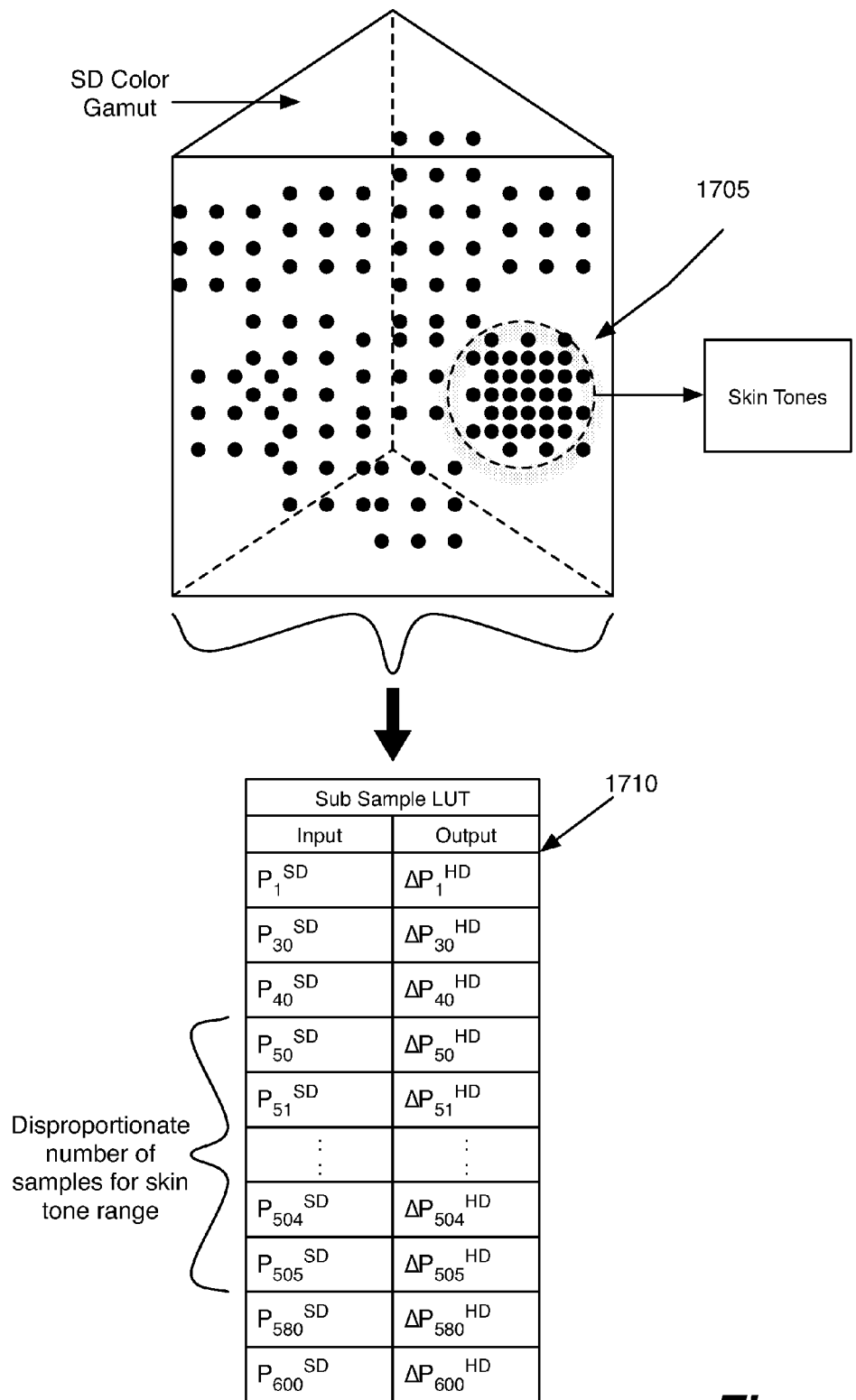
FIG. 17 shows a modification to the delta encoding approach of some embodiments.

FIG. 17 shows a further modification to the delta encoding approach of some embodiments. Specifically, this figure shows that in addition to performing sub-sampling and delta encoding, some embodiments non-uniformly sub-sample the Rec. 601 color space 1705 in order to ensure that the LUT has more samples in one or more sub-regions of interest (e.g., sub-regions including skin tones, foliage, sky, etc.). In this example, the LUT 1710 has more samples in the sub-region of interest that corresponds to skin tones, as shown in FIG. 17, than in the other regions of the SD color gamut. Such non-uniform sampling ensures that the interpolation results for sets of color values produce more accurate results in the sub-region(s) of interest.

D. Chroma Only Encoded LUT

In conjunction with or instead of the sub-sampling, delta encoding, and/or other LUT reduction techniques, some embodiments reduce the number of accesses to the LUT by only storing values for the color region conversion of the chrominance/chroma values and not the luminance or luma values. These embodiments assume that in performing the color conversion the luminance or luma values will not be changed or, if changed, the change will be very slight. Accordingly, these embodiments store color conversion values only for converting the chrominance/chroma values.

Still other embodiments use other techniques to perform lookups in the sub-sample chrominance/chroma space (i.e., 4:2:0 space) in order to reduce the size of the storage structure and the number of accesses to the storage structure. For instance, when performing color region conversion from 4:2:0 Y'CbCr$_{601}$ to 4:2:0 Y'CbCr$_{709}$, these embodiments sub-sample the four luma values to a single luma and combine this value with the chroma values to access the storage structure.

E. Video Processing System

Figure 18:
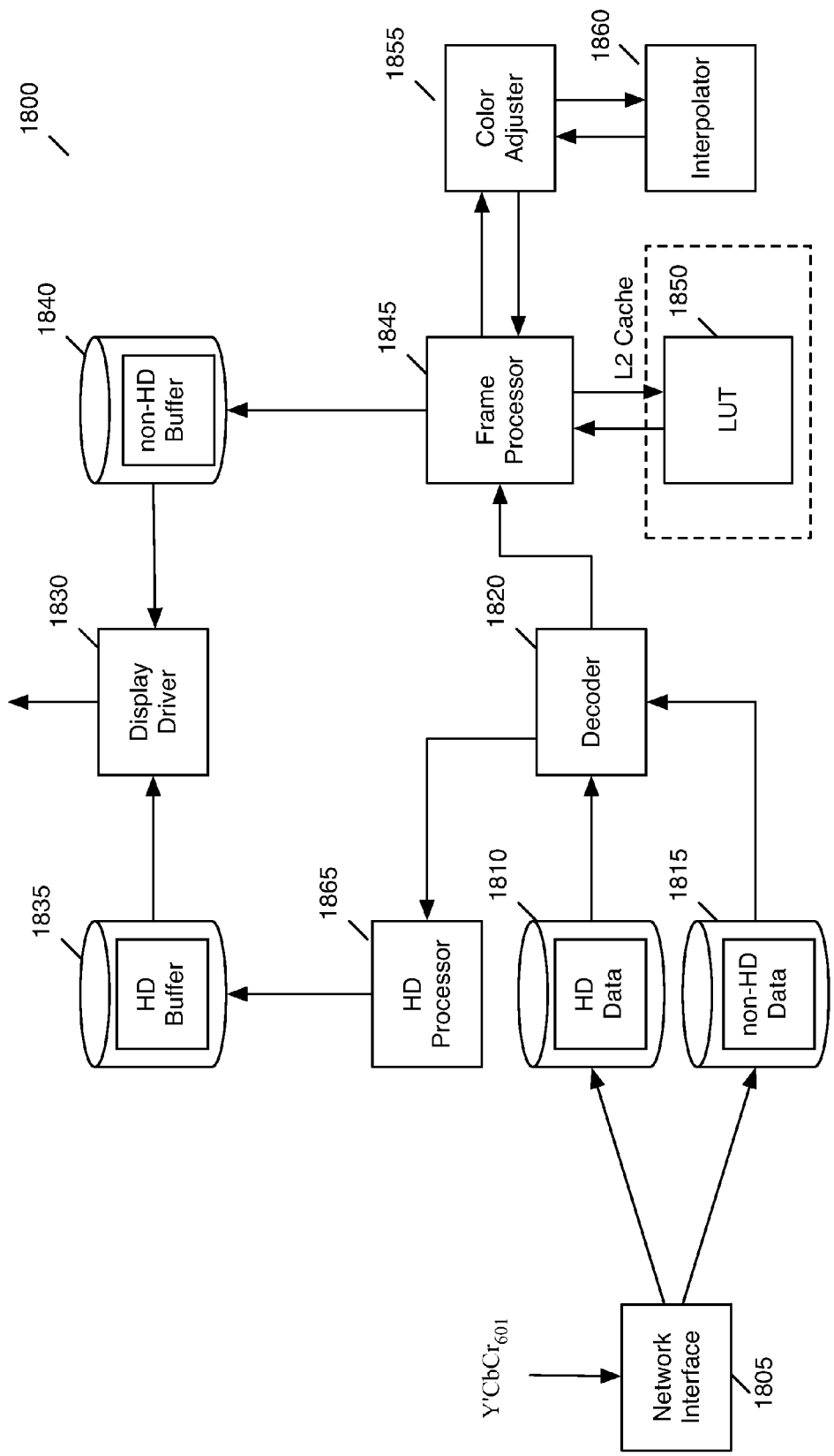
FIG. 18 illustrates a video processing system that uses some of the above-described sub-sampled, delta-encoded LUT color conversion technique.

FIG. 18 illustrates a video processing system 1800 that uses some of the above-described sub-sampled, delta-encoded LUT color conversion techniques. The video processing system 1800 processes either a high definition (HD) Rec. 709 video stream or a non-HD Rec. 601 video stream that is received through a network (e.g., through a telecommunication network or through the Internet) for display on a high definition television or monitor. As shown in FIG. 18, the system 1800 includes a network interface 1805, two buffers 1810 and 1815, a decoder 1820, an HD image processor 1825, a display driver 1830, two frame buffers 1835 and 1840, a frame processor 1845, a LUT 1850, a color adjuster 1855, and an interpolator 1860.

The network interface 1805 communicatively connects the system 1800 to a network (not shown). Through this connection, the network interface receives a video stream through the network. The received video stream is in either Y'CbCr$_{601}$ format or Y'CbCr$_{709}$ format. As it receives the video stream, the network interface stores the received video stream in either buffer 1810 or 1815 based on whether the video stream is HD or non-HD.

The decoder 1815 retrieves the video stream from the buffers and decodes the video frames. When the received video stream is an HD video stream, the decoder supplies the decoded video frames to the HD processor 1865, which performs additional image processing (e.g., scaling, etc.) before storing the processed HD video frames in the frame buffer 1835. The display driver 1830 retrieves the processed HD video frames from the frame buffer 1835 and supplies them to the high definition television.

When the received video stream is a non-HD video stream, the system 1800 first performs color region conversion on the video stream before supplying it to the high definition television. Specifically, in this situation, the decoder 1820 supplies the decoded frames (typically, on a frame-by-frame basis) to the frame processor 1845. On each received decoded frame, the color processor 1845 performs a series of operations. One of the sets of operations is to convert the Y'CbCr$_{601}$ format of the video frame to a Y'CbCr$_{709}$ format. To do this, the frame processor accesses the LUT 1850 for each pixel of the video frame either to retrieve a delta transform vector for the pixel's color component set, or to retrieve a set of delta transform vectors for a set of color component sets that are nearby the pixel's color component set in the Rec. 601 color region.

When the frame processor retrieves a delta transform vector for the pixel's color component set, it uses the color adjustor 1855 to produce new color component set for the pixel by applying the delta transform vector to the vector defined by the pixel's color component set. Alternatively, when the frame processor retrieves multiple delta transform vectors for several nearby color component sets, the frame processor 1845 (1) through the color adjustor 1855, has the interpolator 1860 compute a delta transform vector for the pixel from the retrieved delta transform vectors, and (2) has the color adjustor 1855 apply the computed delta transform vector to the vector defined by the pixel's color component set, in order to obtain a new color component set for the pixel.

After converting the color component values for each pixel of a frame, the frame processor 1845 either (1) stores the processed frame in the frame buffer 1840, or (2) performs some additional image processing operations (e.g., scaling, upsampling, etc.) on the frame and then stores the processed frame in the frame buffer 1840. The display driver 1830 retrieves the processed color-converted video frames from the frame buffer 1840 and supplies them to the high definition display. The display driver in some embodiments performs up converting operations or other operations to process the video frames in buffer 1840 for display on an HD display. In some embodiments, this display driver is part of the HD display. In other embodiments, the video frame data from buffers 1835 and 1840 are supplied to another device (e.g., an audio video receiver) which performs video processing operations (e.g., up converting operations) on the video frame data from one or both of these buffers (e.g., from buffer 1840) before passing along this data to the display device.

In some embodiments, the video processing system 1800 can composite images with the video stream before providing the video stream to the television. In some such embodiments, the video processing system performs its compositing operations in the RGB domain. Accordingly, for some of these embodiments, the LUT 1850 stores and returns $R'G'B'_{709}$ values, or delta transform vectors from which $R'G'B'_{709}$ values can be computed, so that the compositing can be performed in the RGB domain. In these embodiments, video processing system would need to perform color coordinate transform operations to transform the $Y'CbCr_{601}$ format to the $R'G'B'_{601}$ format before the access to the LUT. Also, when the high definition display needs to receive $Y'CbCr_{709}$ video, the video processing system would need to transform the composite $R'G'B'_{709}$ format to $Y'CbCr_{709}$ format after the compositing operation.

F. Process

Figure 19:
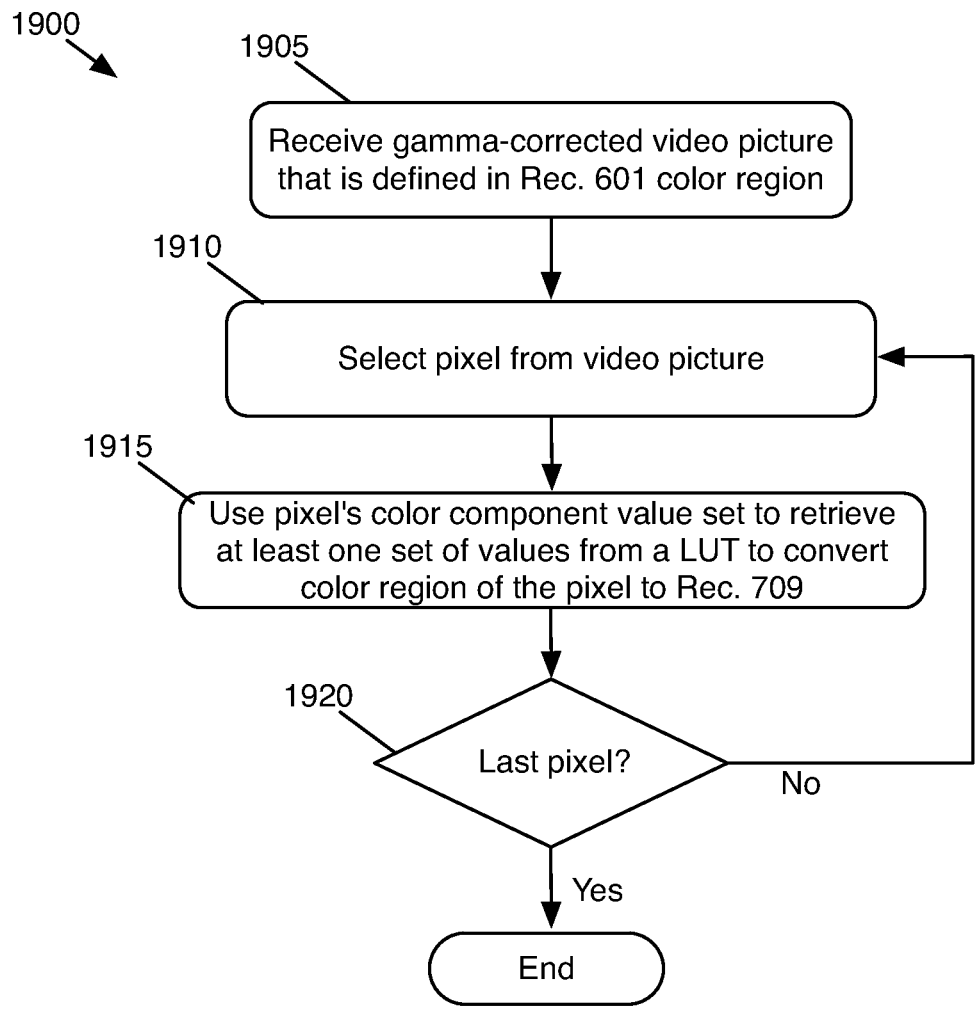
FIG. 19 illustrates a process of some embodiments for converting the color region of each picture of a received video from Rec. 601 color region to a Rec. 709 color region.

FIG. 19 illustrates a process 1900 of some embodiments of the invention. In some embodiments, the system 1800 of FIG. 18 uses the process 1900 repeatedly to convert the color region of each picture of a received video from Rec. 601 color region to a Rec. 709 color region. As shown in FIG. 19, the process 1900 starts (at 1905) when it receives a gamma-corrected video picture (e.g., video frame or field) that is defined in Rec. 601 color region.

The process then selects (at 1910) a pixel from the received video picture. It then uses (1915) the pixel's color component value set to retrieve one or more set of color values from a LUT. As mentioned above, different embodiments use different types of LUTs that store different types of values. Examples of such LUTs include video-range limited LUTs, sub-sampled LUTs, index-reduced LUTs, delta-encoded LUTs, chroma encoded LUTs, etc. Several such LUTs were discussed above by reference to FIGS. 9-17.

At 1915, the process also uses the retrieved color value set(s) to adjust the selected pixel's color values in order to define this pixel's color representation in the Rec. 709 color region. For instance, when the LUT stores delta-encoded, sub-sampled color values, and the LUT stores one set of delta values for the selected pixel, the process (1) retrieves the set of delta transform vectors that is stored for the pixel's component color sample, and (2) adds each delta transform value to its corresponding component color value of the pixel to obtain the particular pixel's component color values in the Rec. 709 region. Alternatively, when the LUT stores delta-encoded, sub-sampled color values, and the LUT does not store one set of delta values for the selected pixel, the process (1) retrieves multiple delta transform vectors that it stores for the pixel's that neighbor the selected pixel, (2) generates the delta transform vector for the selected pixel from the retrieved delta transform vectors, and then (3) adds the delta transform vector to the selected pixel's component color value set.

After 1915, the process determines (at 1920) whether it has color-region converted all the pixels of the video picture. If not, the process returns to 1910, selects another pixel, and then repeats operation 1915 for the newly selected pixel. When the process determines (at 1920) that it has examined all the pixels of the video picture, it ends.

G. LUT Generation

Figure 20:
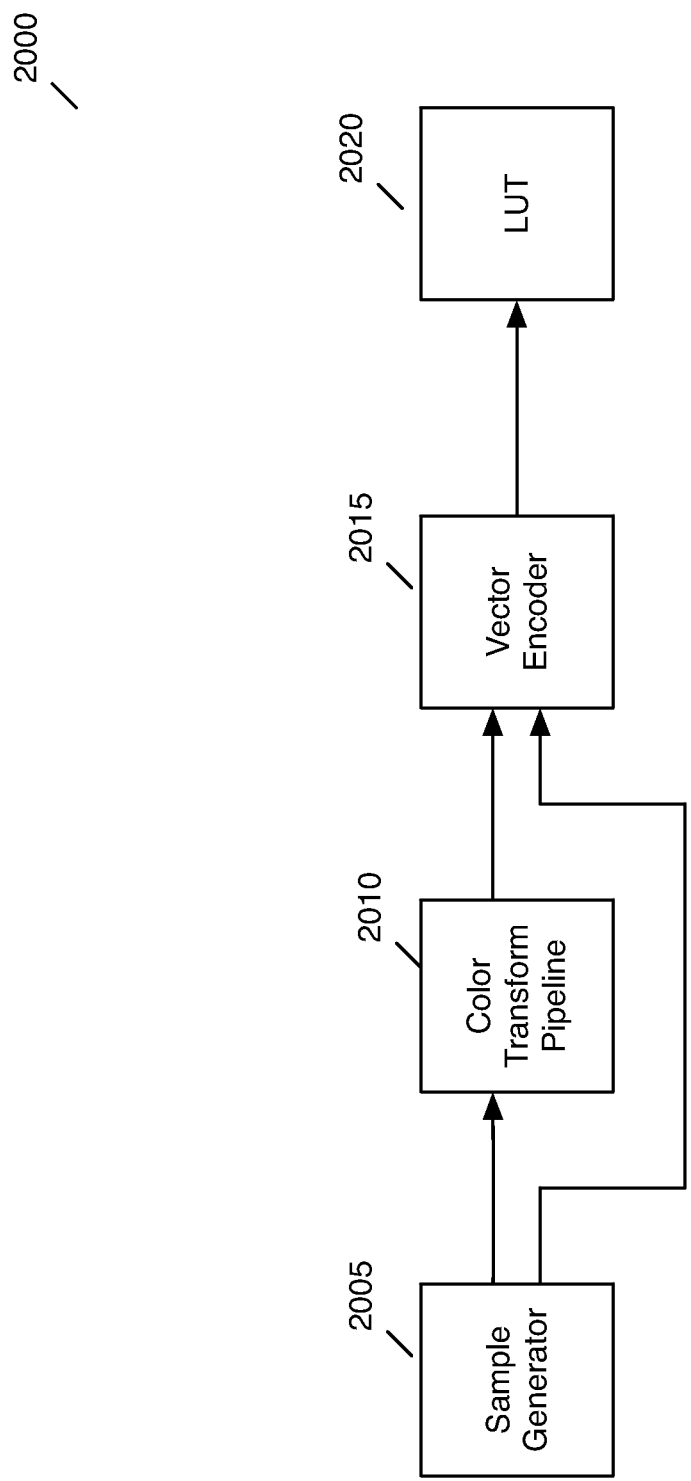
FIG. 20 illustrates a system for generating a sub-sampled, delta encoded LUT.

FIG. 20 illustrates a system 2000 for generating a sub-sampled, delta encoded LUT. This system includes a sample generator 2005, a color transform pipeline 2010, a vector encoder 2015, and a LUT 2020. The sample generator 2005 of some embodiments decomposes the Rec. 601 color region into several rectangular cells, with eight vertices at the corner of each rectangular cell. The sample generator of some such embodiments, supplies each vertex's color component set as a sample color component set to both the color transform pipeline 2010 and the vector encoder 2015.

The color transformation pipeline 2010 performs the color adjustment operations 910 illustrated in FIG. 9. These operations produce a converted, color component set for each sample color component set that the sample generator supplies. The converted, color component sets are then supplied to the vector encoder 2015. This encoder then generates delta transform vectors for each sample by subtracting from each converted color component set from its corresponding sample color component set. The encoder stores each generated delta transform vector in the LUT and defines the indices in the LUT based on the corresponding sample color component set.

IV. ELECTRONIC SYSTEM

Many of the above-described features and applications are implemented as software processes that are specified as a set of instructions recorded on a machine readable storage medium (also referred to as machine readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, Random Access Memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage that can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more electronic systems define one or more specific machine implementations that execute and perform the operations of the software programs.

Figure 21:
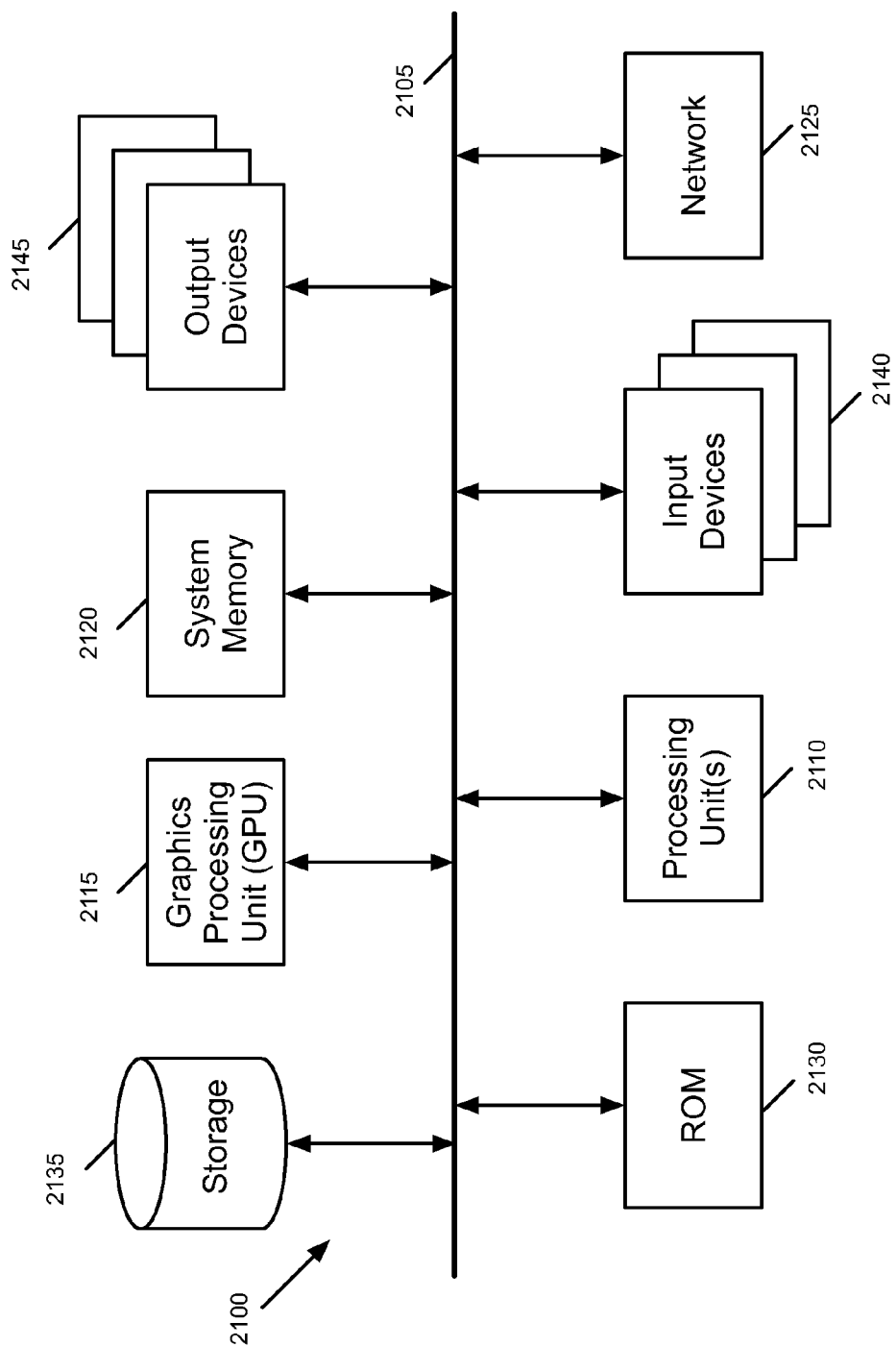
FIG. 21 illustrates an electronic system of some embodiments of the invention.

FIG. 21 conceptually illustrates an electronic system 2100 with which some embodiments of the invention are implemented. The electronic system 2100 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 2100 may include, but is not limited to a bus 2105, processing unit(s) 2110, a graphics processing unit (GPU) 2115, a system memory 2120, a network 2125, a read-only memory 2130, a permanent storage device 2135, input devices 2140, and output devices 2145.

The bus 2105 collectively represents all system, peripheral, and chipset buses that communicatively connect the numerous internal devices of the electronic system 2100. For instance, the bus 2105 communicatively connects the processing unit(s) 2110 with the read-only memory 2130, the GPU 2115, the system memory 2120, and the permanent storage device 2135.

From these various memory units, the processing unit(s) 2110 retrieve instructions to execute and data to process in order to execute the processes of the invention. The processing unit(s) may be a single processor or a multi-core processor in different embodiments. Some instructions are passed to and executed by the GPU 2115. The GPU 2115 can offload various computations or complement the image processing provided by the processing unit(s) 2110.

The read-only-memory (ROM) 2130 stores static data and instructions that are needed by the processing unit(s) 2110 and other modules of the electronic system. The permanent storage device 2135, on the other hand, is a read-and-write memory device. This device is a non-volatile memory unit that stores instructions and data even when the electronic system 2100 is off. Some embodiments of the invention use a mass-storage device (such as a magnetic or optical disk and its corresponding disk drive) as the permanent storage device 2135.

Other embodiments use a removable storage device (such as a floppy disk, flash memory device, etc. and its corresponding disk drive) as the permanent storage device. Like the permanent storage device 2135, the system memory 2120 is a read-and-write memory device. However, unlike storage device 2135, the system memory is a volatile read-and-write memory, such a random access memory. The system memory stores some of the instructions and data that the processor needs at runtime. In some embodiments, the invention's processes are stored in the system memory 2120, the permanent storage device 2135, and/or the read-only memory 2130. For example, the various memory units include instructions for processing multimedia clips in accordance with some embodiments. From these various memory units, the processing unit(s) 2110 retrieve instructions to execute and data to process in order to execute the processes of some embodiments.

The bus 2105 also connects to the input and output devices 2140 and 2145. The input devices enable the user to communicate information and select commands to the electronic system. The input devices 2140 include alphanumeric keyboards and pointing devices (also called "cursor control devices"), cameras (e.g., webcams), microphones or similar devices for receiving voice commands, etc. The output devices 2145 display images generated by the electronic system or otherwise output data. The output devices include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 21, bus 2105 also couples electronic 2100 to a network 2125 through a network adapter (not shown). In this manner, the electronic system can be a part of a network of computers (such as a local area network ("LAN"), a wide area network ("WAN"), or an Intranet, or a network of networks, such as the Internet. Any or all components of electronic system 2100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices. As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals. However, some embodiments are implemented as instructions that are implemented as software processes that are specified as a set of instructions sent over a signal carrying medium (e.g., wireless signals, wired download signals, etc.).

While the invention has been described with reference to numerous specific details, one of ordinary skill in the art will recognize that the invention can be embodied in other specific forms without departing from the spirit of the invention. For instance, while the system 1800 of FIG. 18 is shown to perform both HD and non-HD video processing, the system 800 of FIG. 8A is not specifically shown to process HD and non-HD video content differently. However, in some embodiments, the image processing pipeline shown in FIG. 8A is for color-region converting non-HD content for display on a high definition television/monitor. For processing HD content, the system 800 in some of these embodiments also includes an image processing pipeline like that formed by HD buffers 1810 and 1835, decoder 1820, and HD processor 1865.

In addition, a number of the figures (including FIGS. 4, 8B, 19) conceptually illustrate processes. In some embodiments, the specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method of generating a transform matrix for converting color component values from a first color region to a second color region, the method comprising:
    at an electronic device, identifying a plurality of color component value sets in the first color region;
    for each identified color component value set in the first color region, generating a desired color component value set in the second color region; and
    using the identified and generated color component value sets to identify an n-by-m transform matrix for use by at least one processing unit of the electronic device to convert color component values from the first color region to the second color region.

2. The method of claim 1, wherein using the color component value sets comprises examining different matrix parameters for the n-by-m transform matrix in order to identify a set of matrix parameters that from the identified color component value sets, produces a plurality of color component value sets in the second color region that closely match the desired color component value sets in the second color region.

3. The method of claim 2 further comprising terminating the examination of different matrix parameters after identifying a set of matrix parameters that produces a plurality of color component value sets that sufficiently match the desired color component value sets.

4. The method of claim 2 further comprising terminating the examination of different matrix parameters after identifying a set of matrix parameters that produces a plurality of color component value sets that best match the desired color component value sets after a certain duration of the examination.

5. The method of claim 4, wherein the duration is a temporal duration.

6. The method of claim 4, wherein the duration is based on a number of matrix parameter sets that are examined during the examination.

7. The method of claim 2, wherein the plurality of color component value sets produced by the identified set of matrix parameters result in a difference between the desired and produced color component value sets that is sufficiently minimal.

8. The method of claim 1, wherein using the color component value sets comprises examining different matrix parameters for the n-by-m transform matrix in order to identify a set of matrix parameters that from the identified color component value sets, produces a plurality of color component value sets in the second color region with minimal differences with the desired color component value sets in the second color region.

9. The method of claim 8, wherein identifying the plurality of color component value sets comprises identifying more sets in a sub-region of interest in the first color region than sets in a sub-region of the first color region that is not of interest.

10. The method of claim 9, wherein the sub-region of interest includes color values whose poor replication in the second color region will be perceivable by a viewer.

11. The method of claim 9, wherein the sub-region of interest includes color values related to one of skin tones, foliage, and sky.

12. The method of claim 1, wherein the n-by-m matrix is a first identified matrix, the method further comprising:
    using the identified and generated color component value sets to identify a second n-by-m transform matrix for use by at least one processing unit of the electronic device to convert color component values from the first color region to the second color region, wherein said first and second transform matrices differ in that the first transform matrix is biased for converting color component values in a first sub-region of the first color region while the second transform matrix is biased for converting color component values in a second sub-region of the first color region.

13. The method of claim 1, wherein n and m are equal integer values.

14. The method of claim 1, wherein n and m are different integer values.

15. The method of claim 1, wherein the identified color component value sets in the first color region are gamma corrected.

16. The method of claim 1, wherein the color component values in the first color region are defined in a non-linear domain; and
    wherein the identified n-by-m transform matrix is for converting the color component values from the first color region to the second color region without transforming the color component values to a linear domain.

17. A non-transitory machine readable medium comprising a program for converting color component values from a first color region to a second color region, the program comprising sets of instructions for:
    receiving a gamma-corrected image comprising a plurality of pixels, each pixel defined by reference to a color component value set that is specified in the first color region; and
    using an n-by-m transform matrix to convert the image's color component value sets from the first color region to the second color region without linearization of the color component value sets, said transform matrix defined to reduce errors caused by foregoing the linearization.

18. The non-transitory machine readable medium of claim 17, wherein the transform matrix is defined by (i) generating a desired color sample in the second color region for each of a plurality of color samples in the first color region, and (ii) examining different parameters for the matrix in order to identify a set of matrix parameters that, from the first-region color samples, produces a plurality of color samples in the second color region with minimal differences with the desired color samples in the second color region.

19. The non-transitory machine readable medium of claim 18, wherein the generated, desired color samples are color samples in the second color region that are produced from color samples in the first color region through a set of operations that includes the linearization.

20. The non-transitory machine readable medium of claim 18, wherein the plurality of color samples in the first color region includes more color samples in a sub-region of interest in the first color region than color samples in a sub-region of the first color region that is not of interest.

21. The non-transitory machine readable medium of claim 17, wherein the program further comprises a set of instructions for selecting the n-by-m transform matrix from a plurality of different n-by-m transform matrices that are differently defined to reduce errors in color converting different sub-regions of the first color region.

22. The non-transitory machine readable medium of claim 21, wherein a first transform matrix is defined to reduce errors in color converting first region color component values relating to skin tones, while a second transform matrix is defined to reduce errors in color converting first region color component values not related to the skin tones.

23. The non-transitory machine readable medium of claim 22, wherein the second matrix is defined to reduce errors in color converting first region color component values relating to either foliage or sky.

24. The non-transitory machine readable medium of claim 17, wherein the program further comprises sets of instructions for:
performing a color coordinate transform operation on the color component values in the first color region before using the n-by-m transform matrix that performs the color region conversion operation; and
performing a color coordinate transform operation on the color component values after using the n-by-m transform matrix that performs the color region conversion operation.

25. The non-transitory machine readable medium of claim 17, wherein the n-by-m transform matrix operation not only performs a color region conversion operation but also performs a color coordinate transform operation that converts the color component values of the image from a first color coordinate system to a second color coordinate system.

26. The non-transitory machine readable medium of claim 25, wherein the program further comprises sets of instructions for:
performing a compositing operation on the image after the image has been color coordinate, color region transformed; and
performing a color coordinate transform operation on the image after the compositing operation, in order to transform the image back to the image's original color coordinate system.

27. The non-transitory machine readable medium of claim 17, wherein the color component values include a brightness value, wherein the n-by-m transform matrix is a first n-by-m transform matrix that is defined for a first brightness range, wherein the program further comprises sets of instructions for:
identifying for each color component value set in the image, a brightness range in which the color component value set falls;
selecting for each color component value set, an n-by-m transform matrix from a plurality of n-by-m transform matrices based on the set's brightness range; and
using the selected n-by-m transform matrix for each color component value set to transform the set from the first color region to the second color region.

28. An apparatus comprising:
an interface for receiving a gamma-corrected image comprising a plurality of pixels, each pixel defined by reference to a color component value set that is specified in a first color region; and
a color processor for using an n-by-m transform matrix to convert the image's color component values from the first color region to the second color region without linearization of the color component value sets, said transform matrix defined to reduce errors caused by foregoing the linearization.

29. The apparatus of claim 28, wherein the interface is a network interface for receiving the image over a network.

30. The apparatus of claim 28, wherein the image is part of a video received by the apparatus.

31. The apparatus of claim 28, wherein the interface receives the image in an encoded format, the apparatus further comprising a decoder for decoding the image before the color processor uses the transform matrix.

32. The apparatus of claim 28, wherein the transform matrix is defined by (i) generating a desired color sample in the second color region for each of a plurality of color samples in the first color region, and (ii) examining different parameters for the transform matrix in order to identify a set of matrix parameters that, from the first region color samples, produces a plurality of color samples in the second color region with minimal differences with the desired color samples in the second color region, wherein the generated, desired color samples are color samples in the second color region that are produced from color samples in the first color region through a set of operations that includes the linearization.

33. The apparatus of claim 28, wherein the color processor is a first color processor, wherein the apparatus further comprises:
a second color processor for performing a color coordinate transform operation on the color component values in the first color region before using the n-by-m transform matrix to perform the color region conversion operation; and
a third color processor for performing a color coordinate transform operation on the color component values in the first color region after using the n-by-m transform matrix to perform the color region conversion operation.

34. The apparatus of claim 28, wherein the color processor not only performs a color region conversion operation but also performs a color coordinate transform operation that converts the color component values of the image from a first color coordinate system to a second color coordinate system.

35. The apparatus of claim 34, wherein the color processor is a first color processor, the apparatus further comprising:
a compositor for performing a compositing operation on the image after the image has been color coordinate, color region transformed; and
a second color processor for performing a color coordinate transform operation on the image after the compositing operation, in order to transform the image back to the image's original color coordinate system.

36. A non-transitory machine readable medium comprising a program for converting color component values from a first color region to a second color region, the program comprising sets of instructions for:
receiving an image comprising a plurality of pixels, each pixel defined by reference to a color component value set that is specified in the first color region;
for each pixel, retrieving from a storage structure at least one set of adjustment values for adjusting at least one color component value set that is defined in the first color region to be in a second color region, wherein the sets of adjustment values stored in the storage structure are for adjusting only subsets of pixel color component value sets that the program converts; and
applying the set of adjustment values retrieved for each pixel to the color component value set of the pixel by calculating one set of adjustment values from the retrieved adjustment value sets and applying the calculated set of adjustment values to the color component value set for the particular pixel.

37. The non-transitory machine readable medium of claim 36, wherein the set of instructions for retrieving further comprises a set of instructions for retrieving only one set of adjustment values for another particular pixel when the storage structure stores a single adjustment set that by itself can be used to identify the other particular pixel's color component value set.

38. The non-transitory machine readable medium of claim 36, wherein the image is part of a video clip, wherein the storage structure stores adjustment values only for a range of possible video component color values for display.

39. The non-transitory machine readable medium of claim 36, wherein the adjustment values that are stored in the storage structure include more adjustment values for color component value sets in a sub-region of interest of the first color region than color component value sets in a sub-region of the first color region that is not of interest.

40. The non-transitory machine readable medium of claim 36, wherein the color component adjustment values that are stored in the storage structure are biased towards different sub-regions of interest of the first color region.

\* \* \* \* \*